(12) United States Patent
Mochizuki et al.

(10) Patent No.: US 8,025,225 B2
(45) Date of Patent: *Sep. 27, 2011

(54) MERCHANDISE REGISTRATION PROCESSING SYSTEM

(75) Inventors: Hiroki Mochizuki, Numazu (JP); Hitoshi Iizaka, Fuji (JP); Yoshiya Yamada, Mishima (JP); Osamu Tsuchiya, Tagata (JP); Norihiko Kurihara, Numazu (JP); Makoto Nozawa, Sunto (JP); Yoshihiko Ikeda, Izu (JP); Junya Ebisawa, Izunokuni (JP)

(73) Assignee: Toshiba Tec Kabushiki Kaisha (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/637,341

(22) Filed: Dec. 14, 2009

(65) Prior Publication Data

US 2010/0090002 A1 Apr. 15, 2010

Related U.S. Application Data

(60) Division of application No. 12/082,393, filed on Apr. 10, 2008, now Pat. No. 7,654,453, which is a continuation of application No. PCT/JP2006/320396, filed on Oct. 12, 2006.

(30) Foreign Application Priority Data

Oct. 28, 2005 (JP) ................................. 2005-314369

(51) Int. Cl.
*G06K 7/00* (2006.01)
(52) U.S. Cl. ....................................................... 235/383
(58) Field of Classification Search .................. 235/375, 235/383, 385; 705/20, 28
See application file for complete search history.

(56) References Cited

U.S. PATENT DOCUMENTS

| | | | |
|---|---|---|---|
| 3,716,697 | A | 2/1973 | Weir |
| 6,105,004 | A | 8/2000 | Halperin et al. |
| 6,764,002 | B1 | 7/2004 | Zimmerman et al. |
| 2002/0042737 | A1 | 4/2002 | Suetake |
| 2006/0283942 | A1 | 12/2006 | Nagamachi |

FOREIGN PATENT DOCUMENTS

| | | |
|---|---|---|
| FR | 2 736 177 A1 | 10/1997 |
| GB | 2344 025 A | 5/2000 |
| GB | 2344 671 A | 6/2000 |
| JP | 07-320153 | 12/1995 |

(Continued)

OTHER PUBLICATIONS

Translation of International Preliminary Report on Patentability for PCT/JP2006/320396 dated Apr. 29, 2008.

(Continued)

*Primary Examiner* — Seung H Lee
(74) *Attorney, Agent, or Firm* — Harness, Dickey & Pierce, P.L.C.

(57) ABSTRACT

When obtaining an ID code from a user who holds out an arm to a corresponding merchandise in a noncontact manner, respective information terminal devices accept a registration input of the corresponding merchandise. When accepting the registration input of the corresponding merchandise, registration merchandise information including obtained user identification information and merchandise identification information for identifying the merchandise corresponding to the information terminal device is transmitted to a server device. The server device stores and manages merchandise sales information for the respective ID codes from the registration merchandise information received from the respective information terminal devices. When the ID code is input from a settlement device, the merchandise sales information corresponding to the ID code is transmitted to the settlement device. The settlement device performs the settlement processing based on the merchandise sales information received from the server device.

15 Claims, 15 Drawing Sheets

FOREIGN PATENT DOCUMENTS

| | | |
|---|---|---|
| JP | 08-058931 | 3/1996 |
| JP | 08-190672 | 7/1996 |
| JP | 10-049756 | 2/1998 |
| JP | 2000-509175 | 7/2000 |
| JP | 2004-157849 | 6/2004 |
| JP | 2005-044252 | 2/2005 |
| JP | 2005-270558 | 10/2005 |
| WO | WO 2004/055686 A2 | 7/2004 |

OTHER PUBLICATIONS

"Handy Customer Terminal in Retail", IBM Technical Disclosure Bulletin, vol. 37, No. 11, Nov. 1994 (pp. 123-124).

"Intelligent Showcase System for Retail Sales", IBM Technical Disclosure Bulletin, vol. 37, No. 11, Nov. 1994 (pp. 295-296).

"Computer-Automated Shopping" IBM Technical Disclosure Bulletin, vol. 37, No. 03, Mar. 1994 (p. 269).

"Automated Retailing System", IBM Technical Disclosure Bulletin, vol. 17, Nov. 9, Feb. 1975 (p. 2605).

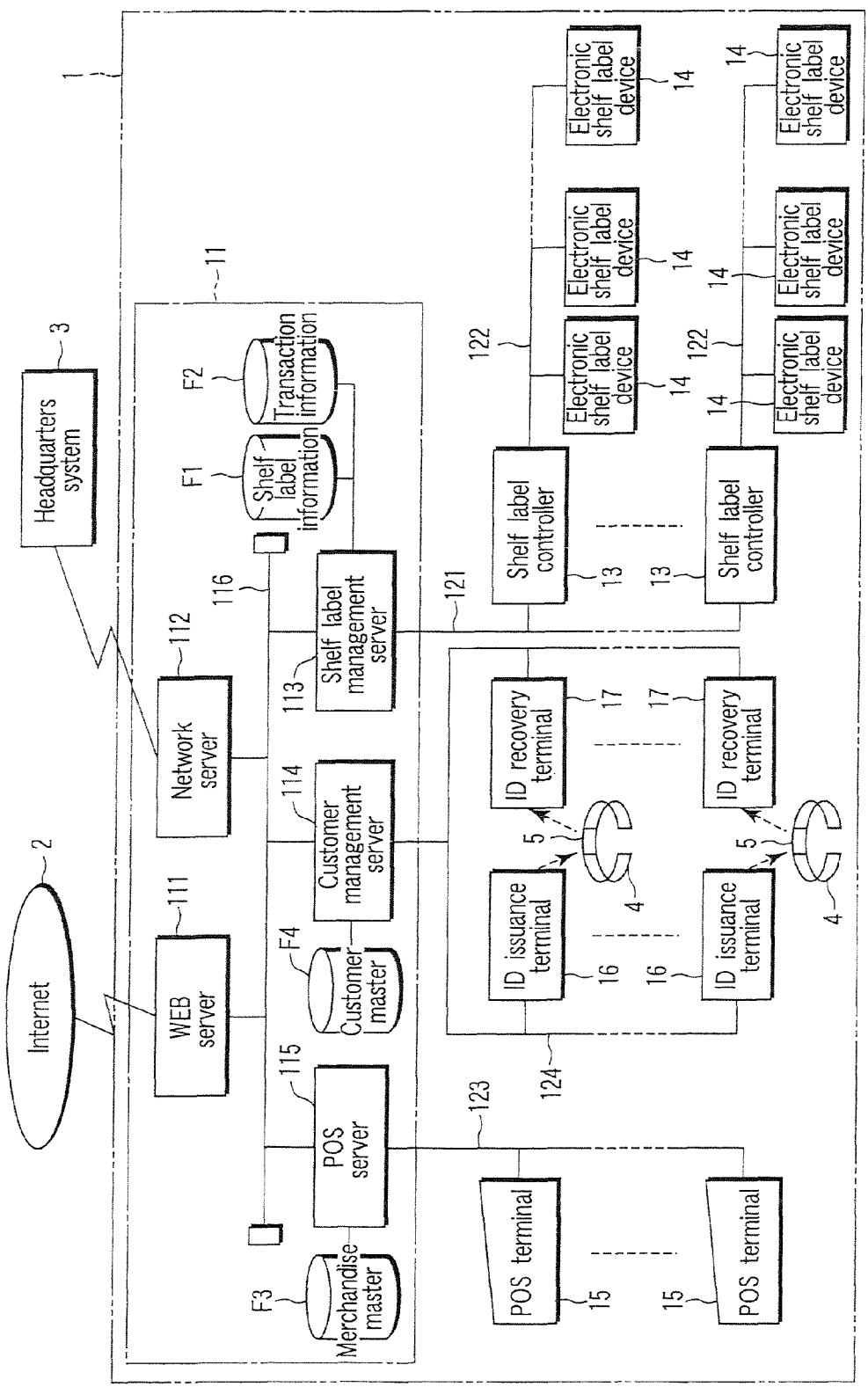
F I G. 1

| Shelf label No. | Merchandise code | Merchandise name | Price |

| Customer code | Biometric information |
|---|---|
|  |  |
|  |  |
|  |  |
| ⋮ | ⋮ |

166

MERCHANDISE REGISTRATION PROCESSING SYSTEM

CROSS REFERENCE TO RELATED APPLICATIONS

This is a divisional application of U.S. application Ser. No. 12/082,393, filed Apr. 10, 2008 which is a continuation application of PCT Application No. PCT/JP2006/320396, filed Oct. 12, 2006, which claims the foreign priority to Japanese Patent Application No. 2005-314369, filed Oct. 28, 2005, the entire contents of which are incorporated herein by reference.

BACKGROUND OF THE INVENTION

1. Field of the Invention The present invention relates to a merchandise registration processing system which is utilized at a shop such as a supermarket, a convenience store, etc.

2. Description of the Related Art In a shop such as a supermarket, a convenience store, etc., the merchandise display space and the settlement place for merchandises are sectionalized. At such a shop, a shopper selects merchandises which the shopper will purchase from among merchandises displayed on the merchandise display space, and puts the merchandises in a shopping basket, then takes the shopping basket to the settlement place. At the settlement place, a settlement device referred to as a POS (Point Of Sales) terminal is arranged. Accordingly, when a shop assistant in charge of the settlement, referred to as a cashier etc., receives an offer of the settlement from the shopper, the shop assistant registers the merchandises which the shopper purchases in the settlement device one by one. The registration is generally performed by making a scanner scan the barcode (merchandise code) put on the merchandises. Then, after registering barcodes of all the merchandises which the shopper purchases, the charge for all the merchandises to be purchased is displayed on a display unit of the settlement device. Then, the shop assistant receives the payment of the charge from the shopper, and gives a receipt to the shopper.

In this way, conventionally, in order to register merchandises which the shopper purchases in the settlement device, the shop assistant picks up the merchandises from the shopping basket one by one, and makes the scanner scan the barcode put on the merchandise, which requires time for the registration.

Accordingly, in order to solve the problem, recently, there has been suggested a merchandise registration processing system utilizing a wireless tag. This system is basically configured by wireless tags which are applied to respective merchandises one by one, a wireless tag reader that reads out information stored in the wireless tags by noncontact communication, and a settlement device such as a POS terminal that performs the settlement processing using information read out by the wireless tag reader. The wireless tag is also referred to as an RFID (Radio Frequency Identification) tag, IC (Integrated Circuit) tag, etc.

This system is provided with a feature that, by using a function of the anticollision, even if a plurality of wireless tags exist in the communication area of an antenna of a wireless tag reader, data can be read in collectively.

Accordingly, for example, as is disclosed in Jpn. Pat. Appln. Publication No. 10-049756, in wireless tags applied to respective merchandises, merchandise codes of the merchandises are stored. Furthermore, a wireless tag reader is arranged on the shopping basket placement part of the settlement place. A shopping basket containing merchandises which a shopper purchases is placed on the shopping basket placement part. Then, information of wireless tags applied to the respective merchandises in the shopping basket is collectively read out by the wireless tag reader. Then, information of the respective wireless tags, that is, merchandise codes are registered in a settlement device. Accordingly, there is caused an effect that the time required for the registration work can be considerably reduced.

Furthermore, in the merchandise registration processing system using wireless tags, since the registration of merchandises in the settlement device is automatically performed, for example, as is disclosed in Jpn. Pat. Appln. Publication No. 2003-272057, there has also been suggested a merchandise registration processing system of the self check-out system in which all the settlement works, including the giving and receiving of the charge, are performed by a shopper him/herself.

However, in the conventional merchandise registration processing system using wireless tags, there is a troublesome work of applying wireless tags to all the merchandises to be sold at a shop one by one. Furthermore, there is also a troublesome work of, to respective wireless tags, writing merchandise codes of merchandises to which the wireless tags are applied.

BRIEF SUMMARY OF THE INVENTION

In view of the above-identified circumstances, an object of the present invention is to provide a merchandise registration processing system that does not apply wireless tags to merchandises one by one, and can remarkably reduce the time required for the merchandise registration at the settlement place.

According to the present invention, there is provided a merchandise registration processing system which includes a plurality of information terminal devices which are so arranged as to correspond to various displayed merchandises respectively, a server device which has a terminal display control means, and a settlement device that performs settlement processing of commercial transaction, which are connected by a communication network.

Each of the information terminal devices has a display unit that displays information related to the merchandise corresponding to the device, and a communication unit that receives information to be displayed on the display unit. The terminal display control means edits information to be displayed on the display units of the respective information terminal devices for the respective information terminal devices, and transmits thus edited information to the corresponding information terminal devices.

Each of the information terminal devices further includes a user recognition means, an input receiving means, and a registration merchandise information transmission means. The user recognition means obtains, from a user who extends an arm to merchandise corresponding to the information terminal device, user identification information for identifying the user in a noncontact manner. Under a condition that the user identification information is obtained by the user recognition means, the input receiving means accepts a registration input of merchandise corresponding to the information terminal device. When there is a registration input of a merchandise received by the input receiving means, the registration merchandise information transmission means transmits registration merchandise information including merchandise identification information for identifying the merchandise and the user identification information obtained by the user identification recognition means from the communication unit to the server device through the communication network.

The server device further includes information reception means, a transaction information storage unit, registration merchandise information processing means, and commercial transaction information transfer means. The information reception means receives information transmitted from the respective information terminal devices through the communication network. The transaction information storage unit has a transaction information storage area for the respective user identification information. Every time the registration merchandise information is received by the information reception means, the registration merchandise information processing means adds the merchandise identification information included in the registration merchandise information to the transaction information storage area for the respective user identification information included in the registration merchandise information of the transaction information storage unit. The commercial transaction information transfer means transfers the merchandise identification information stored for the respective user identification information in the transaction information storage unit to the settlement device.

The settlement device includes an input means for the user identification information, and a settlement processing means. The settlement processing means performs the settlement processing of the commercial transaction with the user identified by the user identification information input through the input means based on the merchandise identification information transferred from the server device.

BRIEF DESCRIPTION OF THE SEVERAL VIEWS OF THE DRAWING

FIG. 1 shows a block diagram indicative of the entire configuration of a merchandise registration processing system;

DETAILED DESCRIPTION OF THE INVENTION

Figures 2, 3:
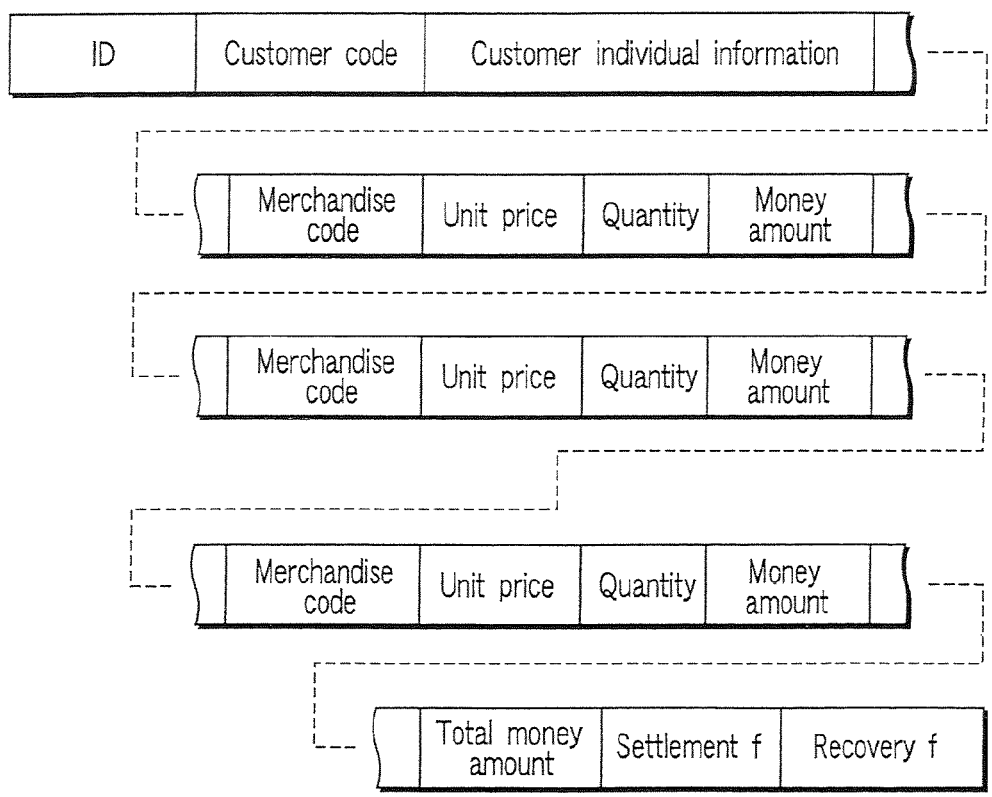
FIG. 2 shows a schematic view indicative of the data structure of a shelf label information record stored in a shelf label information file.
FIG. 3 shows a schematic view indicative of the data structure of a transaction information record stored in a transaction information file.

The best mode to implement the present invention will be described referring to the accompanying drawings.

In this embodiment, to a shop such as a supermarket in which an electronic shelf label management system is established, the merchandise registration processing system according to the present invention is applied.

FIG. 1 shows a block diagram indicative of the entire configuration of a merchandise registration processing system 1 according to the present embodiment. The system 1 includes a server device 11. The server device 11 includes a WEB server 111, a network server 112, a shelf label management server 113, a customer management server 114, a POS server 115, etc.

The WEB server 111 is specialized for respective functions performed on the Internet 2. The network server 112 is specialized for the data communication with an external system such as a headquarters system 3 connected thereto by a dedicated network. The shelf label management server 113 is specialized for the information management related to shelf labels. The customer management server 114 is specialized for the information management related to customers. The POS server 115 is specialized for the information management related to the merchandise sales. The respective servers 111 to 115 are connected mutually by a communication line 116.

The shelf label management server 113, which is a computer that acts as the nerve center of the electronic shelf label management system, is connected to a plurality of shelf label controllers 13 through a communication line 121.

The respective shelf label controllers 13 are so arranged as to correspond to a plurality of merchandise display shelves arranged in the shop respectively. To the respective shelf label controllers 13, all electronic shelf label devices 14 arranged on the merchandise display shelves corresponding thereto are connected through communication lines 122. The electronic shelf label devices 14 are arranged for each of articles of various merchandises displayed on the merchandise display shelves. The respective shelf label controllers 13 function as the data relay units between the shelf label management server 113 and the respective electronic shelf label devices 14.

To the shelf label management server 113, a shelf label information file F1 and a transaction information file F2 are mounted.

In the shelf label information file F1, a shelf label information record having the data structure shown in FIG. 2 is stored. That is, the shelf label information record includes data items, or a shelf label number, merchandise code, merchandise name, unit price, etc. The shelf label number is a unique number preset for each of the electronic shelf label devices 14 to identify the respective electronic shelf label devices 14. The shelf label number may include not only number symbols but also characters such as those of alphabets, and marks. Furthermore, the shelf label number may solely be represented by characters and marks. Merchandise information such as the merchandise code, merchandise name, unit price, etc. is information related to a merchandise article corresponding to the electronic shelf label device 14 specified by the shelf label number of the same record.

In the transaction information file F2, a transaction information record having the data structure shown in FIG. 3 is stored. That is, the transaction information record includes an ID code, a customer code, customer individual information, merchandise sales information such as a merchandise code, unit price, quantity, and money amount, total money amount information, flag information of a settlement flag and a recovery flag. The ID code is a code to identify a shopper who comes to a shop. The customer code is a unique code preset for each customer to identify respective customers who sign a contract of membership with a shop. The customer individual information is the name, sex, age, etc. of a customer specified by the customer code of the same record. The merchandise sales information is a merchandise code, unit price, quantity, money amount, etc. of merchandises which a shopper specified by the ID code of the same record will purchase. The total money amount information is a total money amount of merchandises which a shopper specified by the ID code of the same record purchases.

Of flag information, the settlement flag is a flag that identifies whether or not the settlement of a shopper specified by the ID code of the same record has been completed. In this embodiment, the settlement flag is set to "0" when the settlement has not been completed, and is set to "1" when the settlement has been completed. The recovery flag is a flag that identifies whether or not the ID code is recovered from a shopper specified by the ID code of the same record. In this embodiment, the recovery flag is set to "0" when the ID code has not been recovered, and is set to "1" when the ID code has been recovered.

The transaction information file F2 configures a transaction information storage means provided with a transaction information storage region for respective ID codes which function as user identification information.

The POS server 115, which is a computer that acts as the nerve center of the POS system, is connected to a plurality of POS terminals 15 through a communication line 123.

The respective POS terminals 15 are examples of the settlement device. That is, the respective POS terminals 15 register the sales data of merchandises which a customer has purchased, and performs the settlement processing for the charge. The settlement processing corresponds to various manners of payment such as cash, a credit card, a prepaid card, electronic money, and a debit card.

In the POS server 115, a merchandise master file F3 is mounted.

In the merchandise master file F3, a merchandise information record including data items, or a merchandise code, merchandise name, unit price, merchandise classification code, and shelf label number is stored. The merchandise code is a unique code which is preset for each merchandise to identify various merchandise articles to be sold at a shop. The merchandise name, unit price, merchandise classification code are information of a merchandise specified by the merchandise code of the same record. The shelf label number is a number to specify the electronic shelf label device 14 arranged at the display space for merchandise specified by the merchandise code of the same record.

The customer management server 114, which is a computer that acts as the nerve center of a customer management system, is connected to a plurality of ID issuance terminals 16 and ID recovery terminals 17 through a communication line 124.

The ID issuance terminals 16 are examples of a user identification issuance device. That is, the ID issuance terminal 16 writes user identification information to an RFID tag 5 by noncontact communication. The RFID tag 5 is attached to a bracelet 4. The ID code to identify a shopper (user) carrying about the bracelet 4 becomes user identification information.

The ID recovery terminals 17 are examples of a user identification device. That is, the ID recovery terminal 17 reads the ID code from the RFID tag 5 attached to the bracelet 4 by noncontact communication. The ID code, which is the user identification information, is effective while a shopper is shopping.

In the customer management server 114, a customer master file F4 is mounted.

In the customer master file F4, a customer information record including a customer code, customer individual information of the name, address, telephone number of contact address, sex, age, etc., service point accumulated data, and commercial transaction history data is stored.

Figures 4, 5:
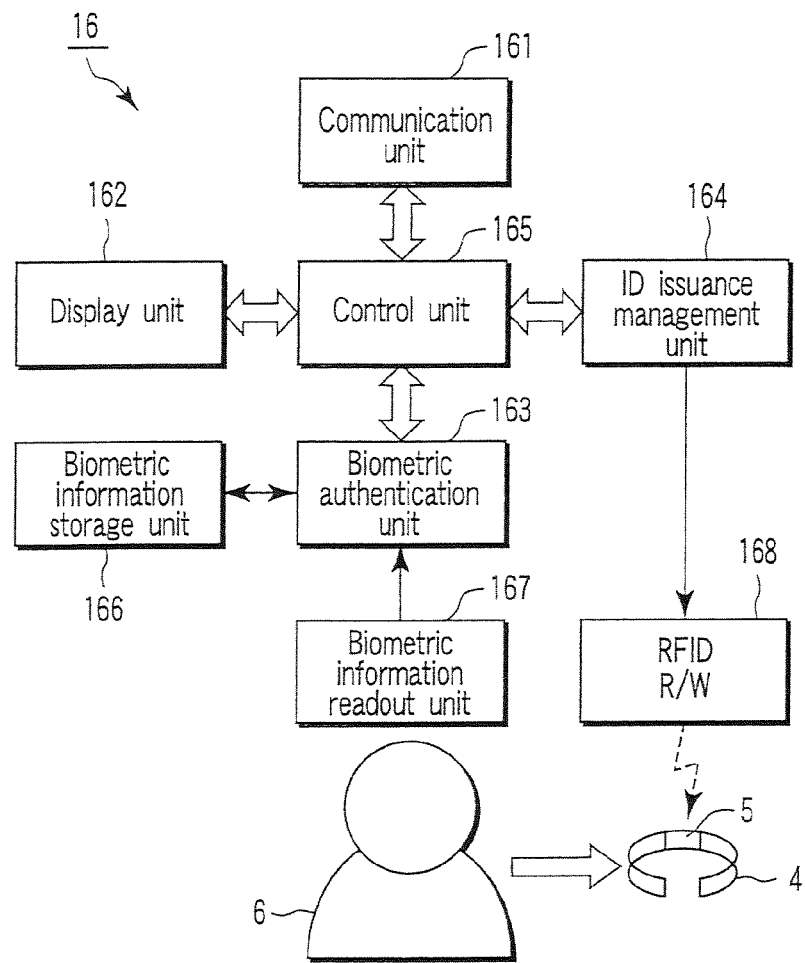
FIG. 4 shows a block diagram indicative of the main part configuration of an ID issuance terminal.
FIG. 5 shows a schematic view indicative of the structure of data stored in a biometric information storage unit of the ID issuance terminal.

FIG. 4 shows a block diagram indicative of the main part configuration of the ID issuance terminal 16. The ID issuance terminal 16 includes a communication unit 161, a display unit 162, a biometric authentication unit 163, an ID issuance management unit 164, a control unit 165 that controls the respective units, etc. The communication unit 161 performs data communication with the customer management server 114 connected thereto through the communication line 124. The display unit 162 displays operation guidance for a user 6 who operates the ID issuance terminal 16.

The biometric authentication unit 163 includes a biometric information storage unit 166 and a biometric information readout unit 167. As shown in FIG. 5, the biometric information storage unit 166 stores, corresponding to customer codes of respective customers, biometric information of the customers which has been registered previously. The biometric information readout unit 167 takes in biometric information of the user 6. The biometric authentication unit 163 collates the biometric information read out by the biometric information readout unit 167 with biometric information of the respective users stored in the biometric information storage unit 166 to perform the identity authentication.

In this embodiment, a fingerprint is used as biometric information. Other than a fingerprint, a retina, an iris, a shape of a palm, etc. can also be used as biometric information.

To the ID issuance management unit 164, an RFID reader/writer 168 is connected. The ID issuance management unit 164 generates a unique ID code according to an ID issuance request from the control unit 165. Then, the ID issuance management unit 164 sends the ID code to the RFID reader/writer 168 as write data to the RFID tag 5. The RFID reader/ writer 168 communicates with the RFID tag 5 which exists in the communication area of an antenna thereof by noncontact communication, and writes the ID code to a user memory unit of the RFID tag 5.

The biometric information storage unit 166 configures a biometric information storage means, the biometric information readout unit 167 configures a biometric information take-in means, the biometric authentication unit 163 configures an identity authentication means, and the ID issuance management unit 164 and RFID reader/writer 168 configure a user identification issuance means.

Figure 6:
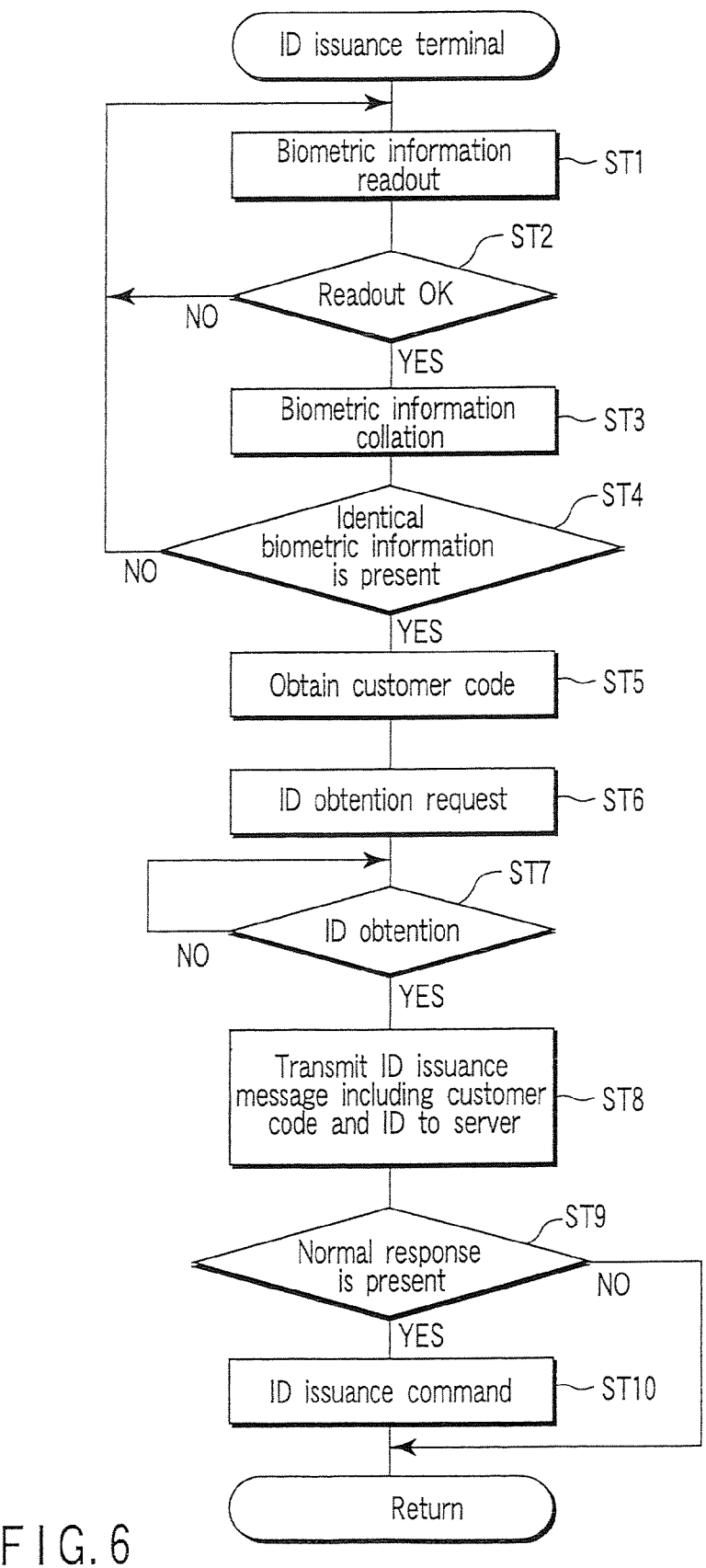
FIG. 6 shows a flowchart indicative of the main control procedure to be executed by a control unit of the ID issuance terminal.

FIG. 6 shows a flowchart indicative of the main control procedure of the control unit 165. In step ST1, the control unit 165 waits for the biometric information readout unit 167 to read out biometric information of the user 6. In step ST2, when it is detected that biometric information is read out from information of the biometric authentication unit 163, the control unit 165 issues a command of collation of biometric information to the biometric authentication unit 163, in step ST3.

The biometric authentication unit 163, which receives the command, collates the biometric information read out by the biometric information readout unit 167 with biometric information stored in the biometric information storage unit 166. Then, the biometric authentication unit 163 determines the presence or absence of identical biometric information, and sends the determination result to the control unit 165. On the other hand, there may be employed a configuration in which the biometric information readout unit 167 detects that biometric information of the user 6 is read out, and then the biometric authentication unit 163 performs the collation of biometric information. In this way, it becomes unnecessary for the control unit 165 to issue a command of collation of biometric information to the biometric authentication unit 163.

When confirming that there is identical biometric information by the biometric authentication unit 163, in step ST5, the control unit 165 obtains a stored customer code related to the biometric information from the biometric information storage unit 166. Next, in step ST6, the control unit 165 sends a command of an ID obtention request to the ID issuance management unit 164. The ID issuance management unit 164, which receives the command, generates a unique ID code. Then, the ID issuance management unit 164 sends the ID code to the control unit 165.

In step ST7, the control unit 165 waits for the ID issuance management unit 164 to send the ID code. Then, when the ID code is sent, in step ST8, the control unit 165 edits an ID issuance message, and transmits the ID issuance message from the communication unit 161 to the customer management server 114. The ID issuance message includes the customer code obtained from the biometric information storage unit 166 and the ID code obtained from the ID issuance management unit 164.

Every time the ID issuance message is received through the communication line 124, the customer management server 114 transfers the ID issuance message to the shelf label management server 113. Every time the ID issuance message is received through the customer management server 114, the shelf label management server 113 executes ID issuance message reception processing.

Figure 9:
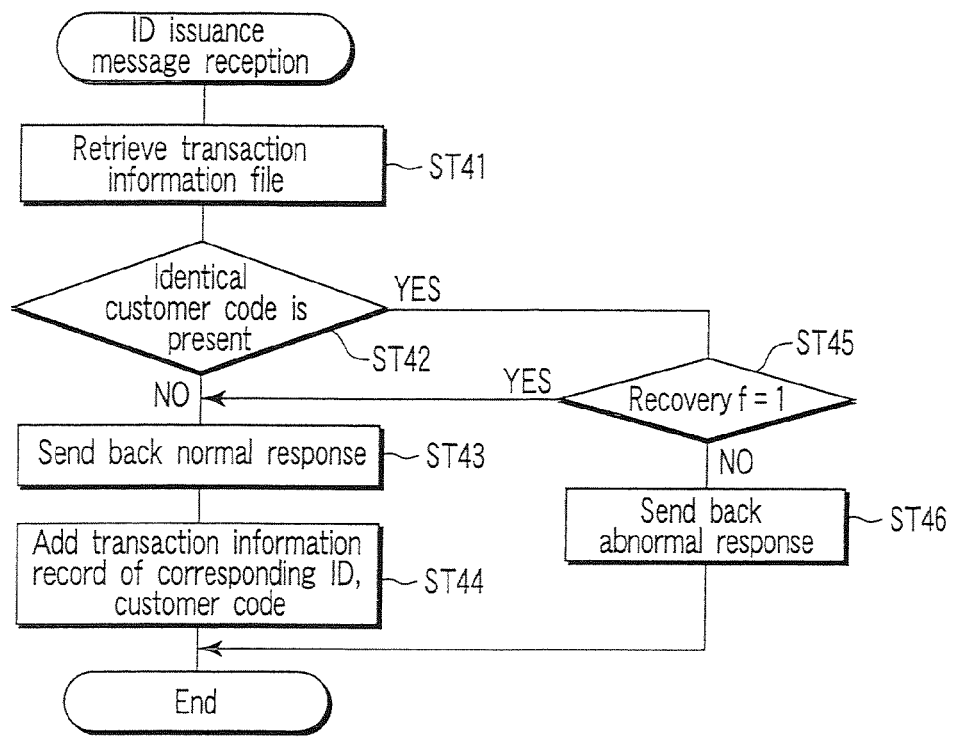
FIG. 9 shows a flowchart indicative of the main part of ID issuance message reception processing to be executed by a shelf label management server.

FIG. 9 shows a flowchart indicative of the procedure of the ID issuance message reception processing. When receiving the ID issuance message, in step ST41, the shelf label management server 113 retrieves the transaction information file F2 using a customer code included in the ID issuance message. Then, in step ST42, the shelf label management server 113 determines whether or not a transaction information record including the customer code is stored in the transaction information file F2.

In the case a transaction information record including the customer code is not stored in the transaction information file F2, in step ST43, the shelf label management server 113 sends back a normal response message to the customer management server 114. Furthermore, in step ST44, a transaction information record is generated, and thus generated transaction information record is added to the transaction information file F2.

The transaction information record includes the ID code and customer code included in the received ID issuance message. Furthermore, the customer individual information stored in the customer master file F4 corresponding to the customer code is also included. The total money amount, settlement flag, and recovery flag are set to "0".

In the case a transaction information record including the customer code is stored in the transaction information file F2, in step ST45, the shelf label management server 113 determines whether or not the recovery flag of the transaction information record is information "1" which indicates that the recovery is finished. In the case the recovery flag is "1", the transaction information record is a transaction information record obtained when the customer specified by the customer code in the record last shopped. Then, the shelf label management server 113 executes the processing in step ST43 and step ST44.

In the case the recovery flag is "0", the transaction information record is a transaction information record obtained when the customer specified by the customer code in the record is currently shopping. Then, in step ST46, the shelf label management server 113 sends back an abnormal response message to the customer management server 114. Accordingly, the duplicate registration of the transaction information record is prohibited.

Then, the shelf label management server 113 ends the ID issuance message reception processing of this time.

The normal response message or abnormal response message sent back from the shelf label management server 113 is transferred to the ID issuance terminal 16, which is the transmission source of the ID issuance message, through the customer management server 114.

In step ST9, the control unit 165 of the ID issuance terminal 16, which transmits the ID issuance message, waits for a response message. Then, only when receiving the normal response message from the customer management server 114, in step ST10, the control unit 165 sends a command of an ID issuance command to the ID issuance management unit 164. The ID issuance management unit 164, which receives the command, sends an ID code generated immediately before to the RFID reader/writer 168. In this way, to the user memory unit of the RFID tag 5 attached to the bracelet 4 which exists in the communication area of an antenna of the RFID reader/writer 168, the ID code is written by noncontact communication.

Figure 7:
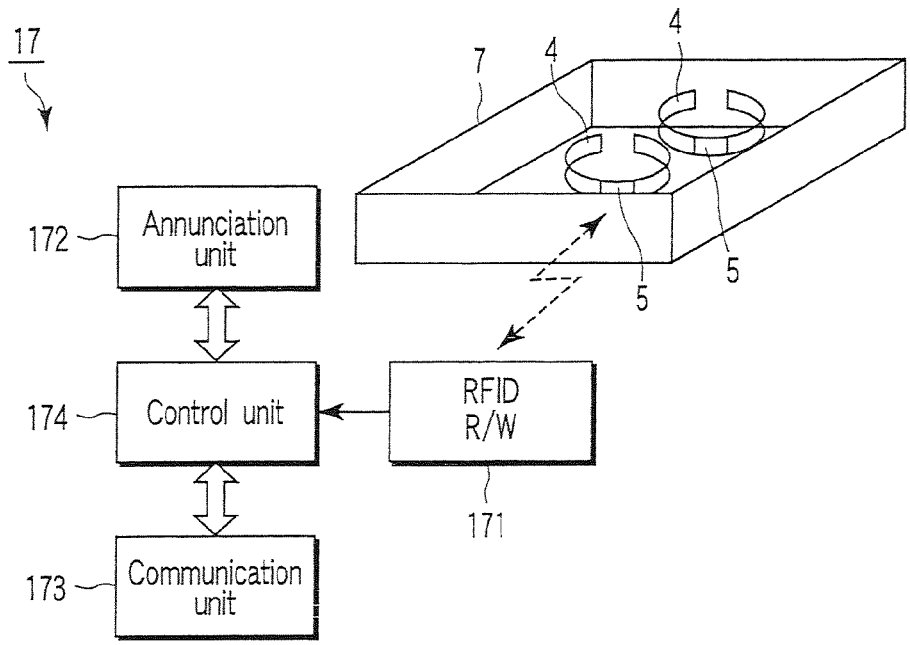
FIG. 7 shows a block diagram indicative of the main part configuration of an ID recovery terminal.

FIG. 7 shows a block diagram indicative of the main part configuration of the ID recovery terminal 17. The ID recovery terminal 17 includes an RFID reader/writer 171, an annunciation unit 172 such as a buzzer and a light-emitting element, a communication unit 173, and a control unit 174 that controls the respective units, etc.

When the bracelet 4 is housed in a bracelet recovery box 7, the RFID reader/writer 171 communicates with the RFID tag 5 attached to the bracelet 4 in a noncontact manner. Then, after reading out an ID code from the user memory unit of the RFID tag 5, the user memory unit is cleared.

Figure 8:
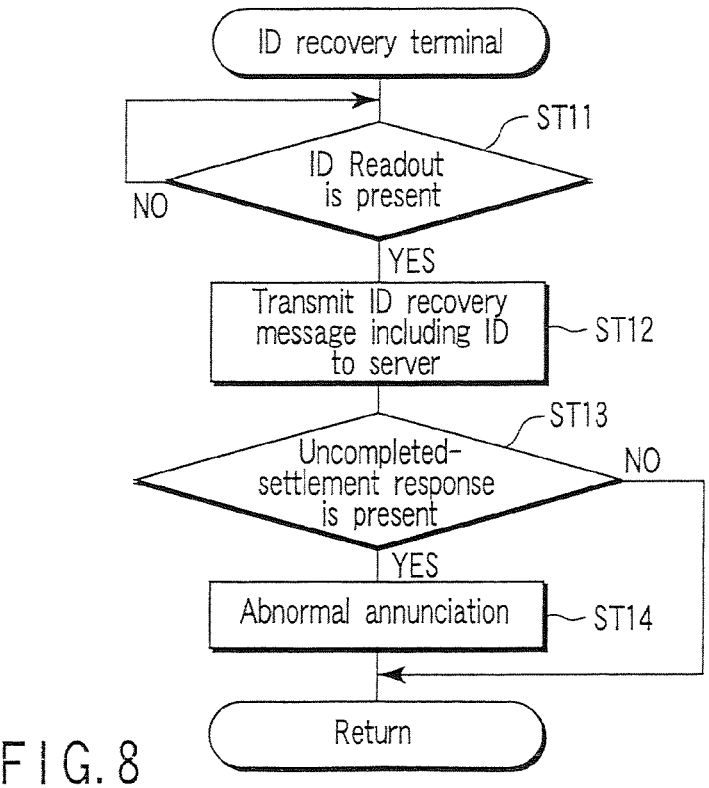
FIG. 8 shows a flowchart indicative of the main control procedure to be executed by a control unit of the ID recovery terminal.

FIG. 8 shows a flowchart indicative of the main control procedure of the control unit 174. In step ST11, the control unit 174 waits for the RFID reader/writer 171 to read out an ID code. When the ID code is read out, in step ST12, the control unit 174 edits an ID recovery message including the ID code, and transmits the ID recovery message from the communication unit 173 to the customer management server 114.

Every time the ID recovery message is received through the communication line 124, the customer management server 114 transfers the ID recovery message to the shelf label management server 113. Every time the ID recovery message is received through the customer management server 114, the shelf label management server 113 executes ID recovery message reception processing.

Figure 10:
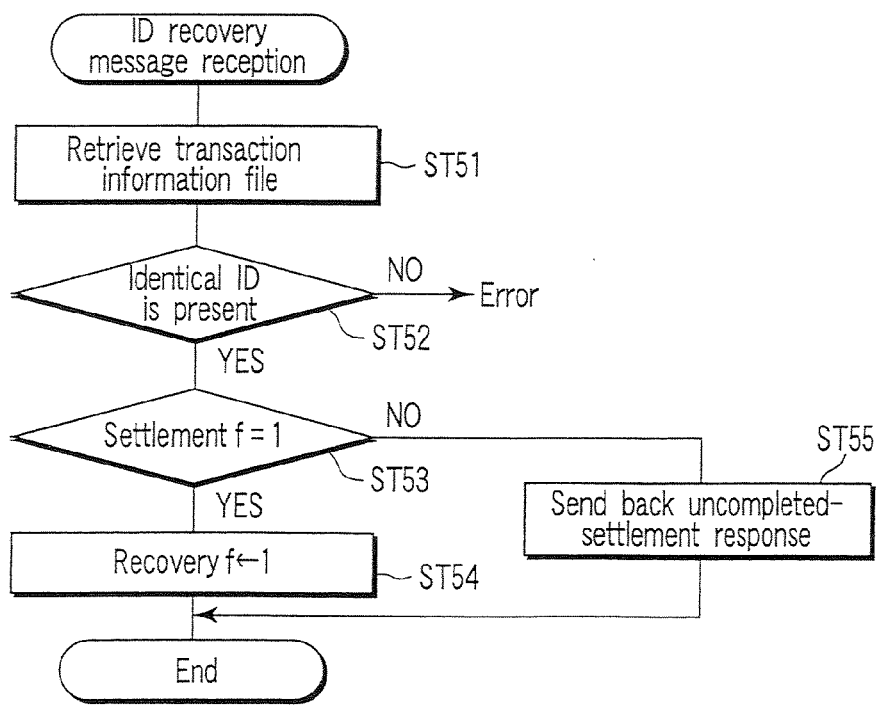
FIG. 10 shows a flowchart indicative of the main part of ID recovery message reception processing to be executed by the shelf label management server.

FIG. 10 shows a flowchart indicative of the procedure of the ID recovery message reception processing. When receiving the ID recovery message, in step ST51, the shelf label management server 113 retrieves the transaction information file F2 using an ID code included in the ID recovery message. Then, in step ST52, the shelf label management server 113 determines whether or not a transaction information record including the ID code is stored in the transaction information file F2.

In the case a transaction information record including the ID code is stored in the transaction information file F2, in step ST53, the shelf label management server 113 determines whether or not the settlement flag of the transaction information record is information "1", which indicates that the settlement has been completed (completion determination means).

In the case the settlement flag is "1", a shopper for whom the ID code is issued puts the bracelet 4 into the bracelet recovery box 7 after the settlement of the commercial transaction has been completed. Then, in step ST54, the shelf label management server 113 updates the recovery flag of the transaction information record to "1".

In the case the settlement flag is "0", a shopper for whom the ID code is issued puts the bracelet 4 into the bracelet recovery box 7 without completing the settlement of the commercial transaction. Then, in step ST55, the shelf label management server 113 sends back an uncompleted-settlement response message to the customer management server 114 (annunciation control means).

Then, the shelf label management server 113 ends the ID recovery message reception processing of this time.

The uncompleted-settlement response message sent back from the shelf label management server 113 is transferred to the ID recovery terminal 17, which is the transmission source of the ID recovery message, through the customer management server 114.

In step ST13, the control unit 174 of the ID recovery terminal 17, which transmits the ID recovery message, waits for the response message. Then, when receiving the uncompleted-settlement response message from the customer management server 114, in step ST14, the control unit 174 operates the annunciation unit 172. That is, the control unit 174 gives warning that the shopper returns the bracelet 4 having the RFID tag 5 attached thereto to the bracelet recovery box 7 without performing the settlement of the commercial transaction.

The ID recovery terminals 17 configures a user identification obtention means by the RFID reader/writer 171, a user identification transmission means by the control unit 174 and communication unit 173, and an annunciation means by the control unit 174 and annunciation unit 172.

Figure 11:
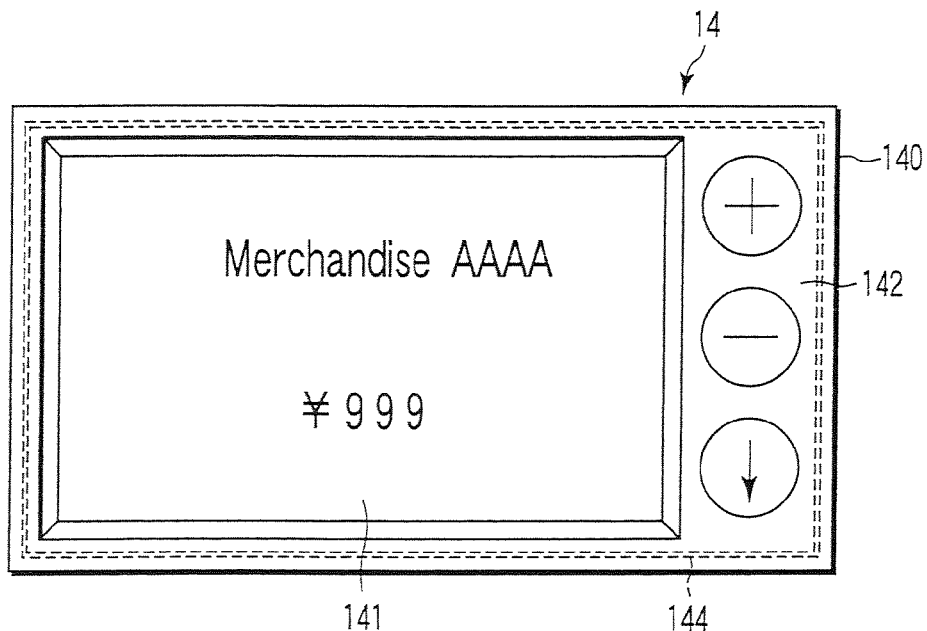
FIG. 11 shows a plan view of an electronic shelf label device.
Figure 12:
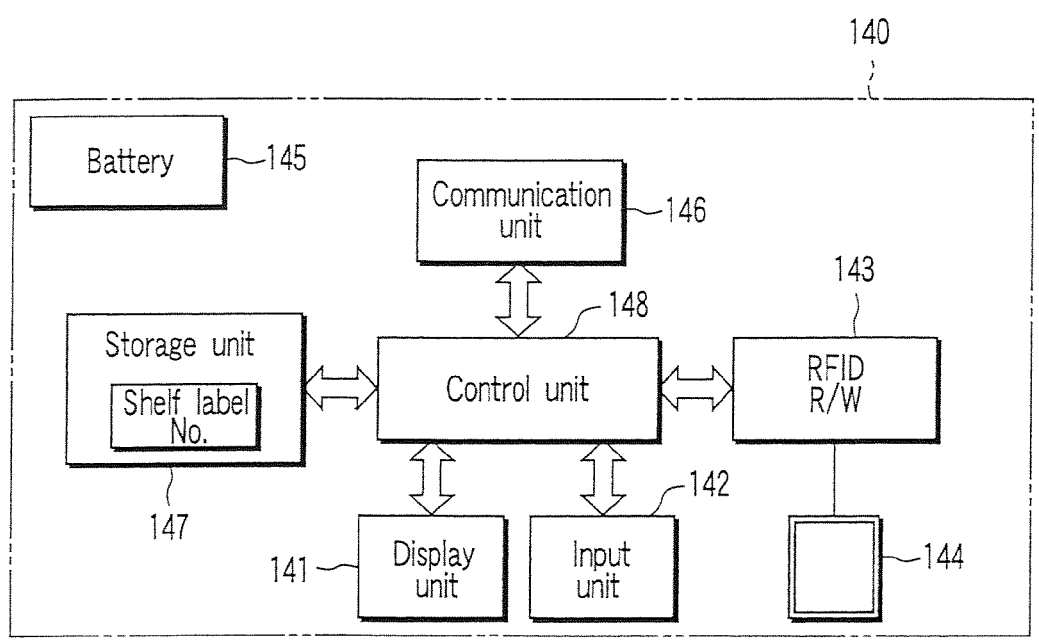
FIG. 12 shows a block diagram indicative of the main part configuration of the electronic shelf label device.

FIG. 11 shows a front view of the electronic shelf label device 14. FIG. 12 shows a block diagram indicative of the main part configuration of the electronic shelf label device 14. The electronic shelf label device 14 has, on the front side of a housing 140 in the form of a label, a display unit 141 and an information input unit 142. Furthermore, an antenna 144 of an RFID reader/writer 143 is buried substantially along the outer circumference of the housing 140. The display unit 141 displays the name, price, etc. of merchandises. On the information input unit 142, a "+" (plus) button, a "−" (minus) button, and an arrow button are arranged.

The electronic shelf label device 14 has a battery 145 mounted thereto as a driving source. Furthermore, the electronic shelf label device 14 includes a communication unit 146, a nonvolatile storage unit 147, and a control unit 148. The communication unit 146 performs data communication with the shelf label controllers 13 connected thereto through the communication lines 122. The storage unit 147 stores display data or the merchandise name, price, etc. Furthermore, in order to identify the respective electronic shelf label devices 14, the storage unit 147 stores and retains a unique shelf label number set for the respective shelf label devices. The electronic shelf label device 14 functions as an information terminal device of the present invention.

Figure 13:
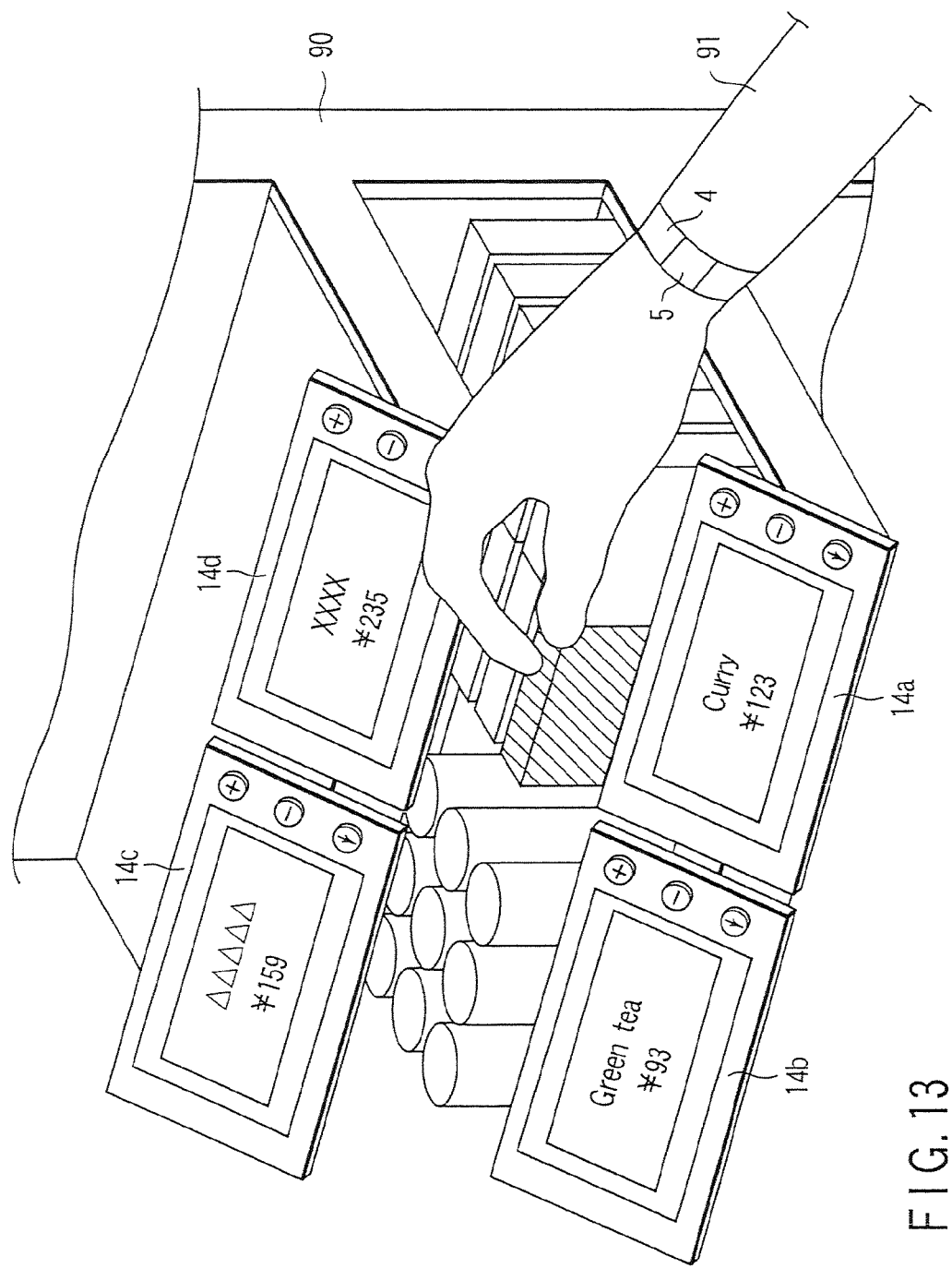
FIG. 13 shows a schematic view indicative of an example of use of the electronic shelf label device.

The thus-configured electronic shelf label device 14 directs the directivity of the antenna 144 to the front side of the housing 140, and sets a distance of approximately several cm to several ten cm from the front side to the communication range. For example, as shown in FIG. 13, the user holds out an arm 91 to seize merchandise "curry" (shown by hatching in FIG. 13) exhibited on a merchandise display shelf 90. Then, the RFID tag 5 of the bracelet 4 attached to the wrist of the user comes into the communication area of the antenna 144 of an electronic shelf label device 14a arranged on the merchandise display shelf 90 corresponding to the merchandise. As a result, data stored in the memory unit of the RFID tag 5, that is, the ID code is read out by the RFID reader/writer 143 of the electronic shelf label device 14a in a noncontact manner.

At this time, the RFID tag 5 does not come into the communication area of the respective antennas 144 of electronic shelf label devices 14b, 14c, and 14d which are located close to the electronic shelf label device 14a. Accordingly, the ID code is not read out.

The RFID reader/writer 143 and its antenna 144 configure a user recognition means that obtains user identification information (ID code) for identifying the user from the user who holds out an arm to the corresponding merchandise in a noncontact manner.

Figure 14:
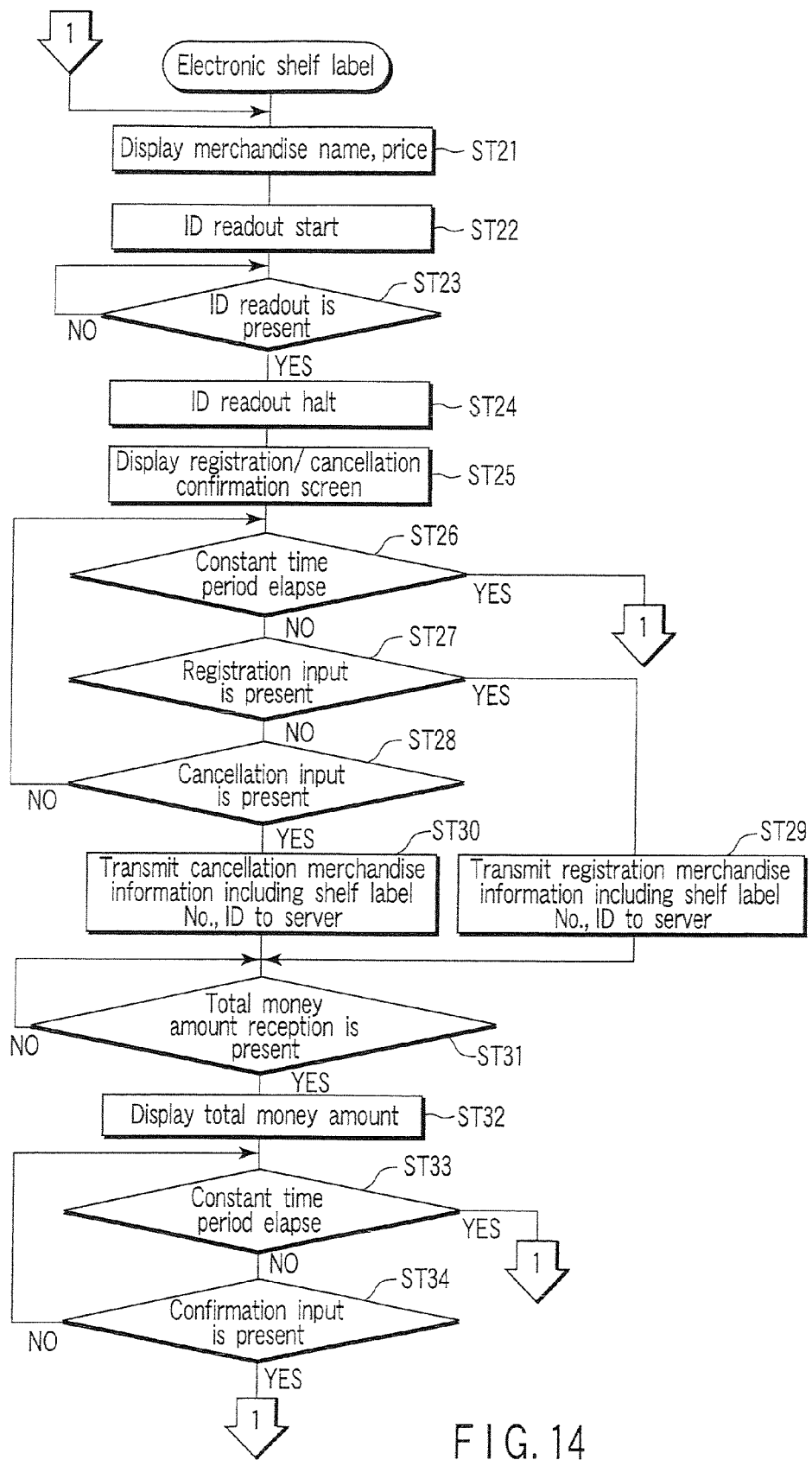
FIG. 14 shows a flowchart indicative of the main control procedure to be executed by a control unit of the electronic shelf label device.

FIG. 14 shows a flowchart indicative of the procedure of the main processing which the control unit 148 of the electronic shelf label device 14 executes. Firstly, the storage units 147 of the respective electronic shelf label devices 14 store, in the shelf label information file F1, merchandise shelf label information of the merchandise name and price, which are so stored as to correspond to the shelf label number of the electronic shelf label device 14. The merchandise shelf label information has been previously downloaded from the shelf label management server 113 through the shelf label controllers 13.

In step ST21, the control unit 148 makes the display unit 141 display the merchandise shelf label information. Next, in step ST22, the RFID reader/writer 143 is made to start reading out the RFID tag 5. In this way, when the RFID tag 5 comes into the communication area of the antenna 144, an ID code stored in the memory unit of the RFID tag 5 is read out by the RFID reader/writer 143 in a noncontact manner.

In step ST23, the control unit 148 waits for the ID code to be read out. When the ID code is read out, after temporarily storing the ID code in the storage unit 147, in step ST24, the control unit 148 temporarily halts the reading out operation by the RFID reader/writer 143.

Next, in step ST25, the control unit 148 makes the display unit 141 displays a registration/cancellation confirmation screen. On this screen, information to make a shopper confirm the registration or cancellation of registration for a merchandise to be sold corresponding to the electronic shelf label device 14 is displayed. The control unit 148 waits for information of the registration or cancellation of registration for a merchandise to be input through the information input unit 142 (input receiving means).

Figure 17:
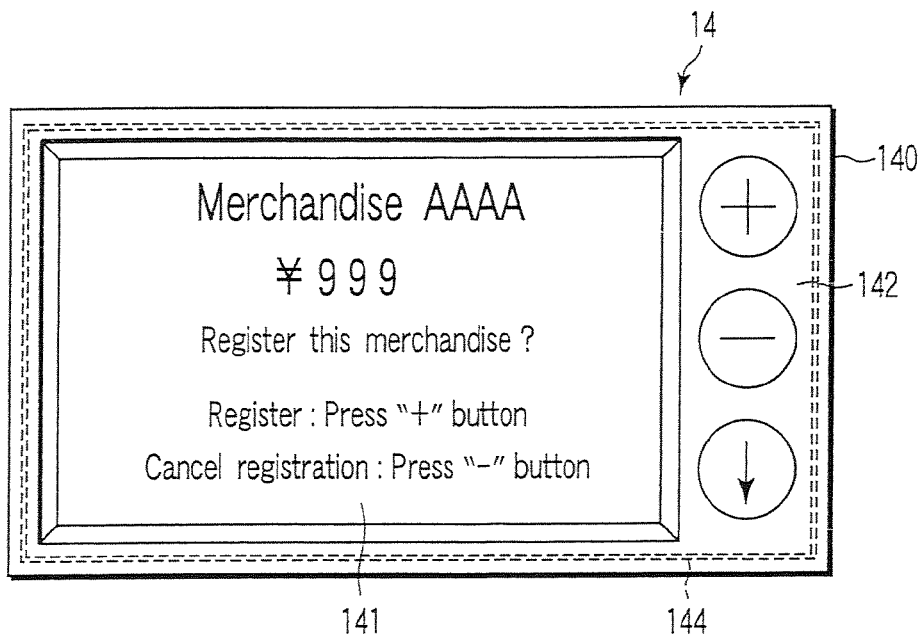
FIG. 17 shows a plan view indicative of an example of a registration/cancellation confirmation screen displayed on the electronic shelf label device.

FIG. 17 shows an example of the registration/cancellation confirmation screen. In this example, a shopper who registers a merchandise displayed on the display unit 141 operates the "+" button, which is the first operation unit of the information input unit 142. A shopper who cancels registering the same merchandise operates the "−" button, which is the second operation unit.

After displaying the registration/cancellation confirmation screen, in step ST26, the control unit 148 waits for a constant time period to elapse. Then, in the case the "+" button or "−" button are not operated during the time period, the processing returns to step ST1, and the control unit 148 returns the screen of the display unit 141 to the merchandise shelf label information screen.

In step ST27, in the case the "+" button is operated during the constant time period; the control unit 148 assumes that registration of a merchandise corresponding to the electronic shelf label device 14 is prescribed. Then, in step ST29, a registration merchandise information message is edited, and the registration merchandise information message is transmitted from the communication unit 146 to the shelf label management server 113 through the shelf label controller 13 (registration merchandise information transmission means). The registration merchandise information message includes the shelf label number stored in the storage unit 147 of the electronic shelf label device 14 and the ID code read out immediately before from the RFID tag 5.

In step ST28, in the case the "−" button is operated during the constant time period, the control unit 148 assumes that cancellation of the registration of a merchandise corresponding to the electronic shelf label device 14 is prescribed. Then, in step ST30, a cancellation merchandise information message is edited, and the cancellation merchandise information message is transmitted from the communication unit 146 to the shelf label management server 113 through the shelf label controller 13 (cancellation merchandise information transmission means). The cancellation merchandise information message includes the shelf label number stored in the storage unit 147 of the electronic shelf label device 14 and the ID code read out immediately before from the RFID tag 5.

Every time the registration merchandise information message is received from any one of the electronic shelf label devices 14, the shelf label management server 113 executes registration merchandise information reception processing.

Figure 15:
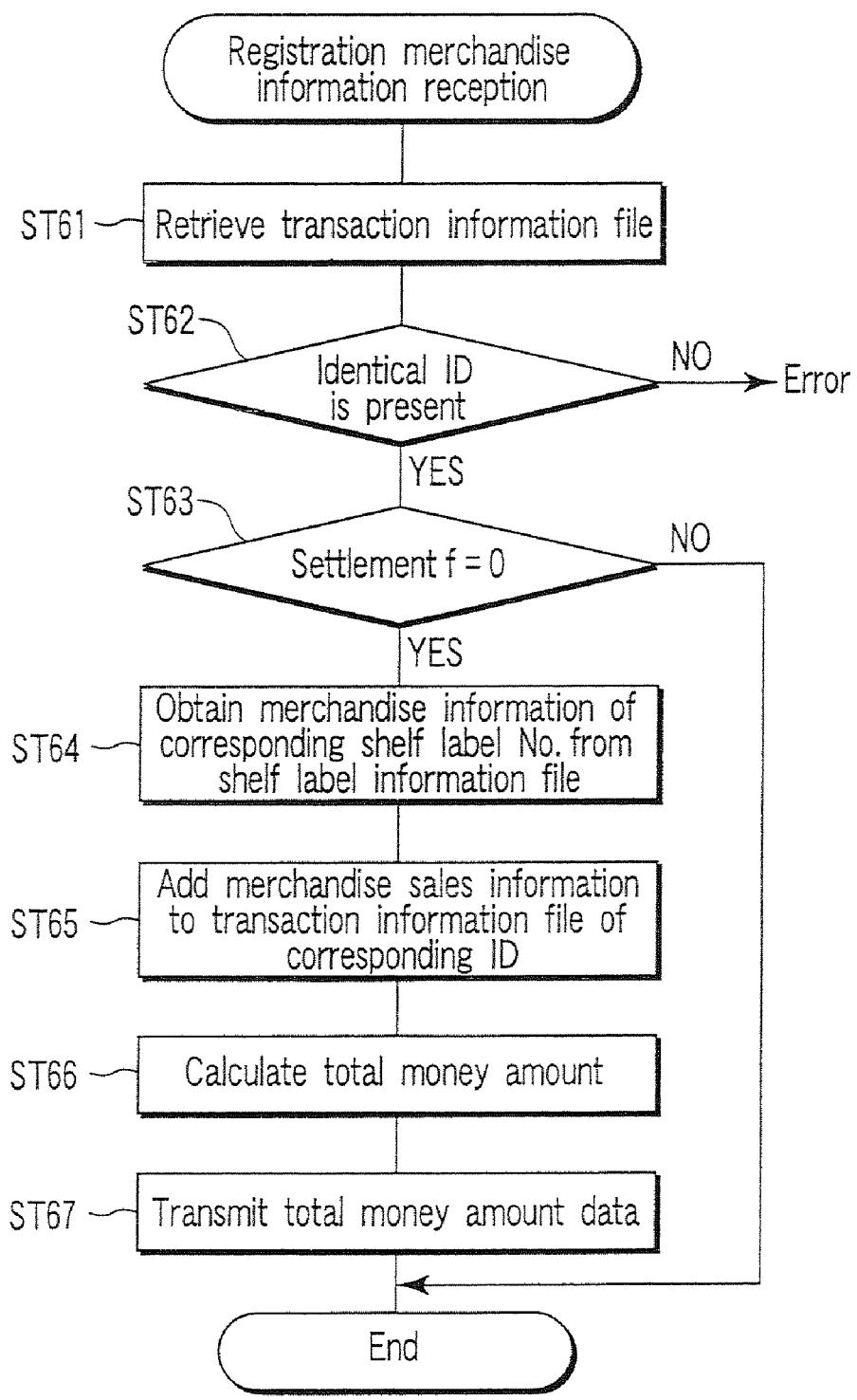
FIG. 15 shows a flowchart indicative of the main part of registration merchandise information reception processing to be executed by the shelf label management server.

FIG. 15 shows a flowchart indicative of the procedure of the registration merchandise information reception processing. When receiving the registration merchandise information message, in step ST61, the shelf label management server 113 retrieves the transaction information file F2 using an ID code included in the registration merchandise information message. Then, in step ST62, the shelf label management server 113 determines whether or not a transaction information record including the ID code is stored in the transaction information file F2.

In the case a transaction information record including the ID code is stored in the transaction information file F2, in step ST63, the shelf label management server 113 determines whether or not the settlement flag of the transaction information record is information "0", which indicates that the settlement is not finished. In the case the settlement flag is "1", a shopper for whom the ID code is issued has completed the settlement of the commercial transaction. In this case, the shelf label management server 113 ends the registration merchandise information reception processing.

In the case the settlement flag is "0", a shopper for whom the ID code is issued has not completed the settlement of the commercial transaction. In this case, in step ST64, the shelf label management server 113 retrieves the shelf label information file F1 using a shelf label number included in the registration merchandise information message. Then, the shelf label management server 113 obtains a merchandise code and a unit price of a shelf label information record including the shelf label number from the shelf label information file F1.

Next, in step ST65, the shelf label management server 113 adds merchandise sales information to a transaction information record including the ID code of the transaction information file F2 (registration merchandise information processing means). The merchandise sales information includes a merchandise code and a unit price obtained from the shelf label information file F1, a quantity (1), and a money amount (unit price).

Then, in step ST66, the shelf label management server 113 adds the money amount of the merchandise sales information, which is added this time, to the total money amount of a transaction information record including the ID code (total calculation means). Then, in step ST67, the shelf label management server 113 transmits information indicative of the total money amount after the addition of the money amount to the electronic shelf label device 14 which is the transmission source of the registration merchandise information message (total money amount transfer means).

Furthermore, every time the cancellation merchandise information message is received from any one of the electronic shelf label devices 14, the shelf label management server 113 executes cancellation merchandise information reception processing.

Figure 16:
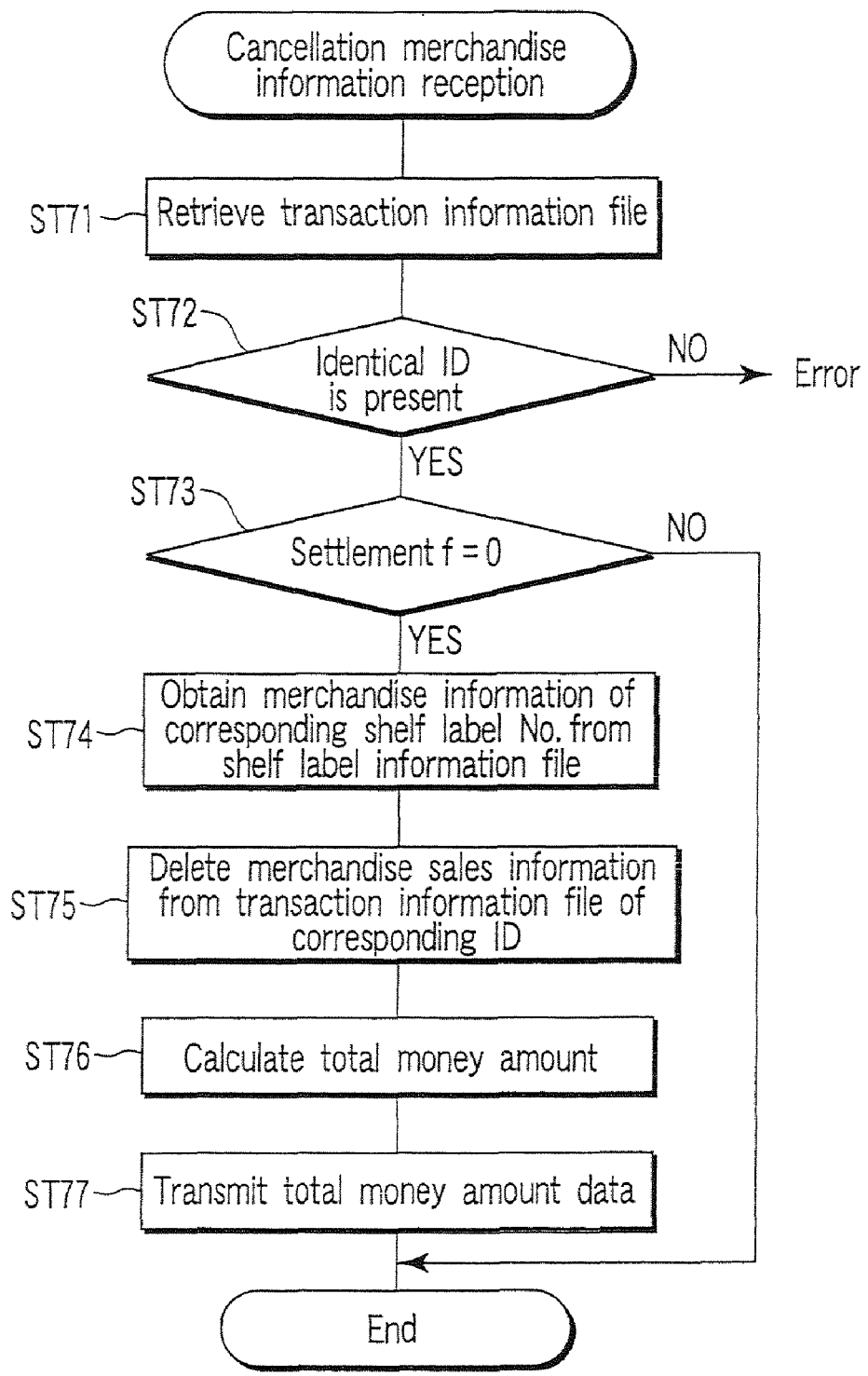
FIG. 16 shows a flowchart indicative of the main part of cancellation merchandise information reception processing to be executed by the shelf label management server.

FIG. 16 shows a flowchart indicative of the procedure of the cancellation merchandise information reception processing. In step ST71, the shelf label management server 113, which receives the cancellation merchandise information message, retrieves the transaction information file F2 using an ID code included in the cancellation merchandise information message. Then, in step ST72, the shelf label management server 113 determines whether or not a transaction information record including the ID code is stored in the transaction information file F2.

In the case a transaction information record including the ID code is stored in the transaction information file F2, in step ST73, the shelf label management server 113 determines whether or not the settlement flag of the transaction information record is information "0" which indicates that the settlement is not finished. In the case the settlement flag is "1", a shopper for whom the ID code is issued has completed the settlement of the commercial transaction. In this case, the shelf label management server 113 ends the cancellation merchandise information reception processing.

In the case the settlement flag is "0", a shopper for whom the ID code is issued has not completed the settlement of the commercial transaction. In this case, in step ST74, the shelf label management server 113 retrieves the shelf label information file F1 using a shelf label number included in the cancellation merchandise information message. Then, the shelf label management server 113 obtains a merchandise code and a unit price of a shelf label information record including the shelf label number from the shelf label information file F1.

Next, in step ST75, the shelf label management server 113 deletes merchandise sales information including the obtained merchandise code and unit price from a transaction information record including the ID code of the transaction information file F2 (cancellation merchandise information processing means).

Then, in step ST76, the shelf label management server 113 subtracts the money amount of the merchandise sales information, which is deleted this time, from the total money amount of a transaction information record including the ID code (total calculation means). Then, in step ST77, the shelf label management server 113 transmits information indicative of the total money amount after the money amount is subtracted to the electronic shelf label device 14, which is the transmission source of the cancellation merchandise information message (total money amount transfer means).

Explanation is returned to FIG. 14.

In step ST31, the control unit 148 of the electronic shelf label device 14, which transmits the registration merchandise information or cancellation merchandise information to the shelf label management server 113 in step ST29 or step ST30, waits for information indicative of the total money amount. Then, when receiving information indicative of the total money amount from the shelf label management server 113 through the shelf label controller 13, in step ST32, the control unit 148 makes the display unit 141 display the total money amount represented by the information (total display control means).

Figure 18:
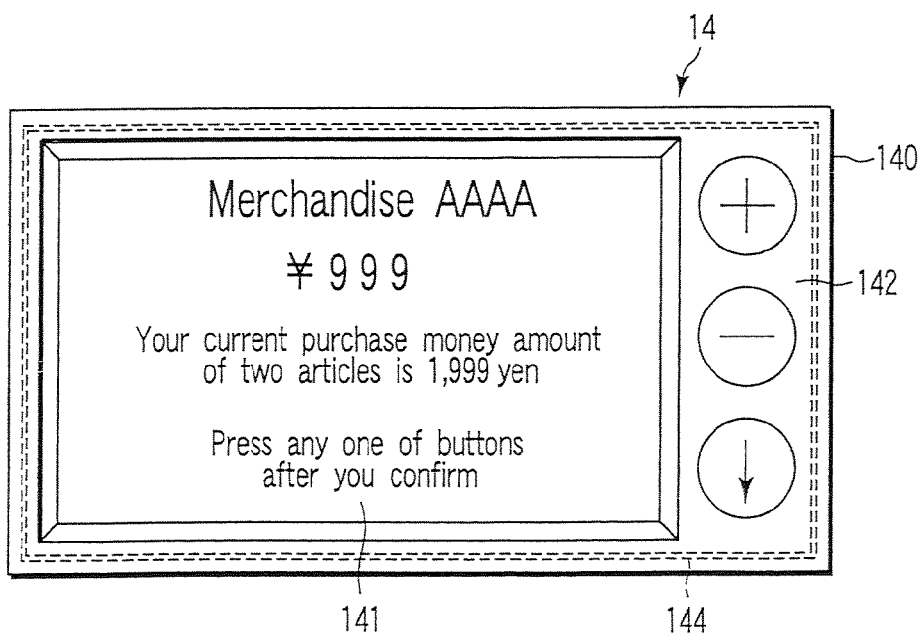
FIG. 18 shows a plan view indicative of an example of a total money amount display screen displayed on the electronic shelf label device.

FIG. 18 shows an example of the total money amount display screen. In this example, a shopper who confirms the total money amount operates any one of the buttons of the information input unit 142.

After displaying the total money amount display screen, in step ST33, the control unit 148 waits for a constant time period to elapse. Then, during the time period, in step ST34, in the case it is detected that any one of the buttons of the information input unit 142 is operated, or in the case it is detected a constant time period has elapsed, the processing returns to step ST1, and the control unit 148 returns the screen of the display unit 141 to the merchandise shelf label information screen for the merchandise name and price.

Figure 19:
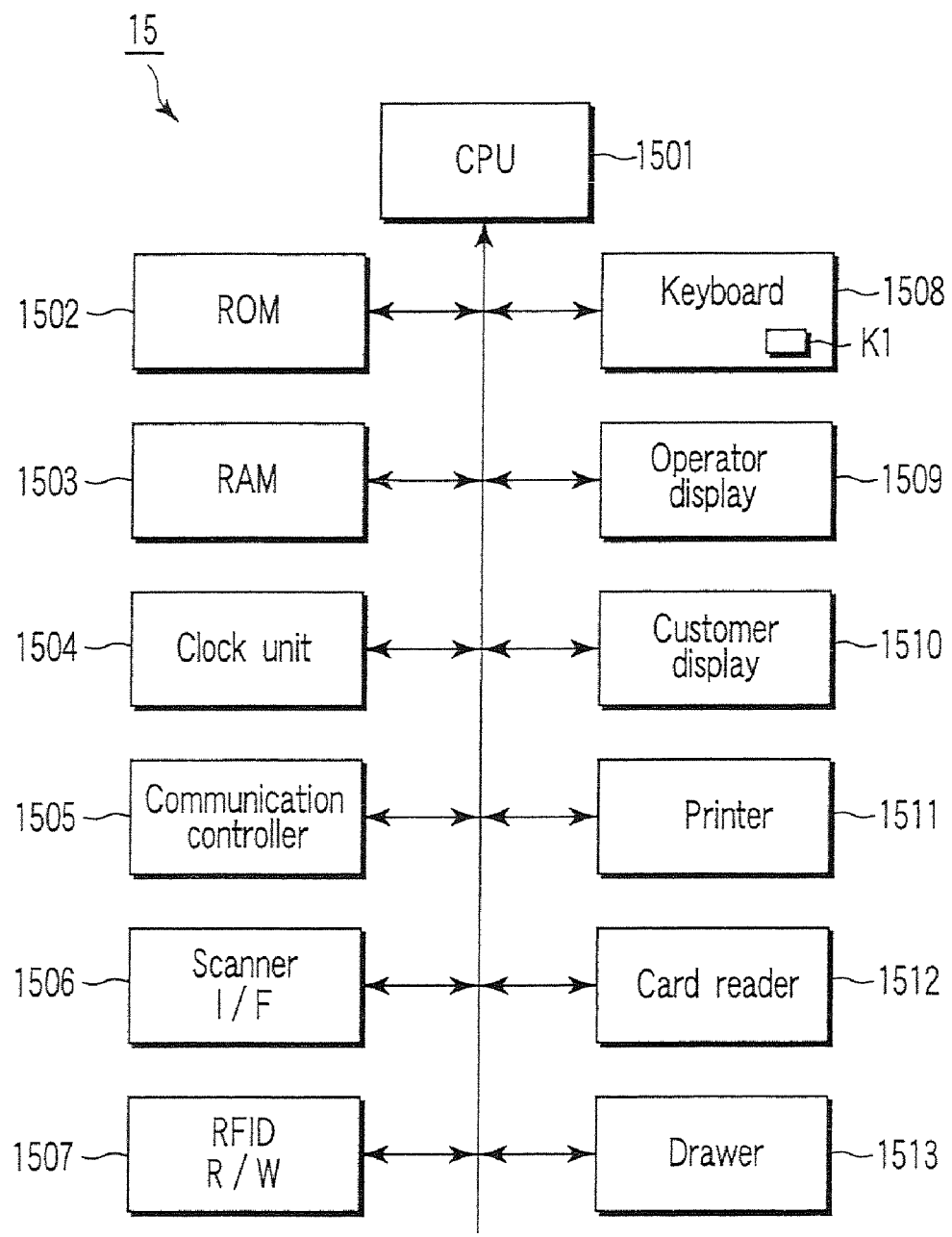
FIG. 19 shows a block diagram indicative of the main part configuration of a POS terminal.

FIG. 19 shows a block diagram indicative of the main part configuration of the POS terminal 15. The POS terminal 15 includes a CPU 1501 as a control unit main body. Furthermore, the POS terminal 15 includes a ROM 1502 and a RAM 1503 as storage units. Furthermore, the POS terminal 15 includes a clock unit 1504, a communication controller 1505, a scanner interface 1506, an RFID reader/writer 1507, a keyboard 1508, an operator display 1509, a customer display 1510, a printer 1511, a card reader 1512, a drawer 1513, etc.

The clock unit 1504 keeps the current date and time. The communication controller 1505 controls the data communication with the POS server 115 connected thereto through the communication line 123. The scanner interface 1506 is an interface to which a scanner to scan an optical scan code such as a barcode is connected. An RFID reader/writer 1507 reads out an ID code from the RFID tag 5 carried about by a shopper who makes payment. The RFID reader/writer 1507 configures an input means for user identification information (ID code).

On the keyboard 1508, there are arranged keys for inputting merchandise sales information such as a merchandise code, quantity, and money amount, deposit/current-total keys which function as close keys to declare closing registration for one commercial transaction, a key such as a credit total key which is arranged on an existing POS terminal, and furthermore, a settlement key K1 to declare the settlement start of a shopper for whom an ID code is issued from the ID issuance terminal 16.

Figure 20:
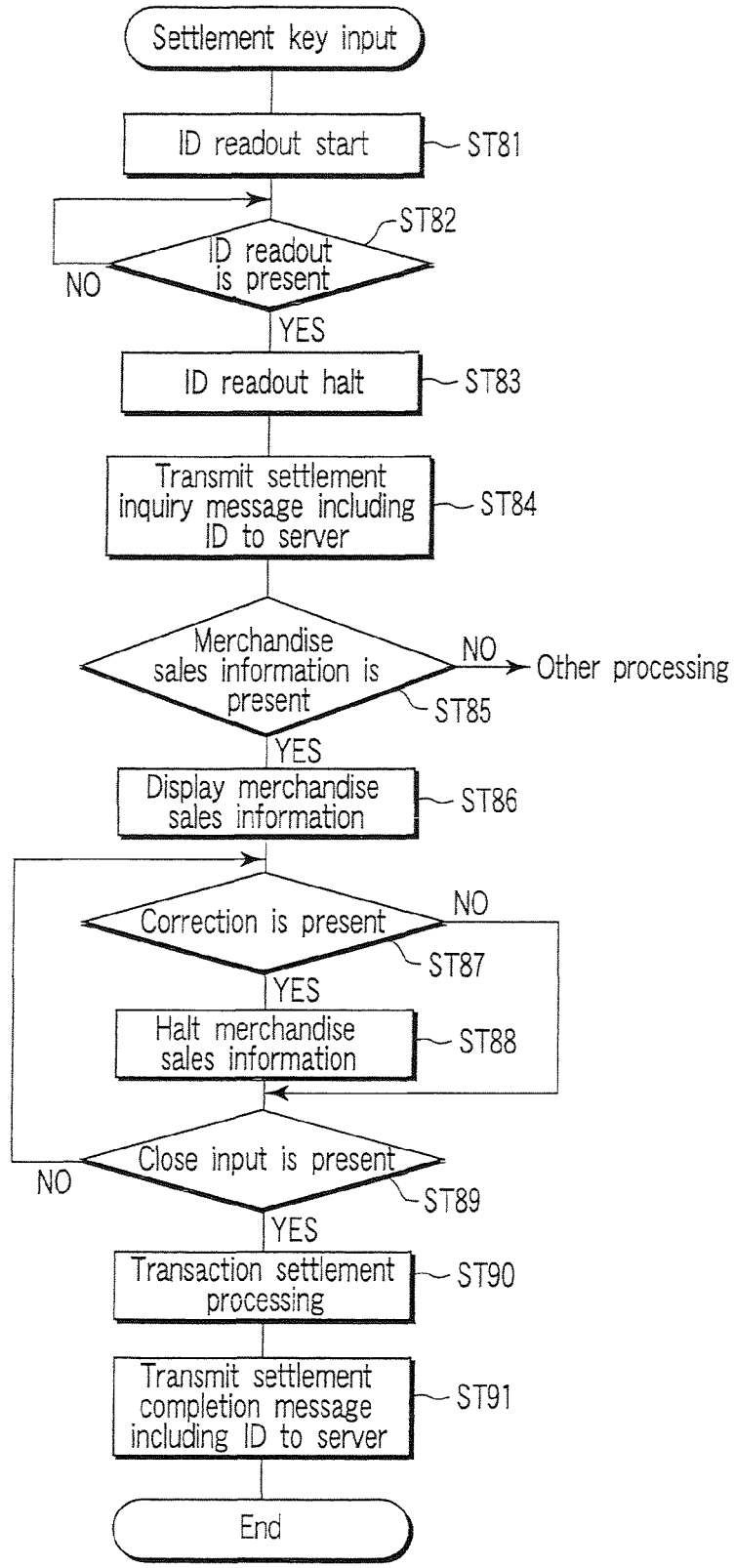
FIG. 20 shows a flowchart indicative of the main part procedure of settlement key input processing to be executed by a CPU of the POS terminal.

When the settlement key K1 is operated for input, the CPU 1501 starts settlement key input processing represented in a flowchart shown in FIG. 20. Firstly, in step ST81, the CPU 1501 starts the operation of reading out the RFID tag 5 by the RFID reader/writer 1507. Then, in step ST82, the CPU 1501 waits for an ID code to be read out from the RFID tag 5.

When the ID code is read out, after temporarily storing the ID code in the RAM 1503, in step ST83, the CPU 1501 temporarily halts the reading out operation by the RFID reader/writer 1507. Next, in step ST84, the CPU 1501 edits a settlement inquiry message, and transmits the settlement inquiry message to the POS server 115 through the communication controller 1505 (user inquiry means). The settlement inquiry message includes the ID code temporarily stored in the RAM 1503.

Every time the settlement inquiry message is received from the POS terminal 15, the POS server 115 transfers the settlement inquiry message to the shelf label management server 113. Every time the settlement inquiry message is received through the POS server 115, the shelf label management server 113 executes settlement inquiry reception processing.

Figure 21:
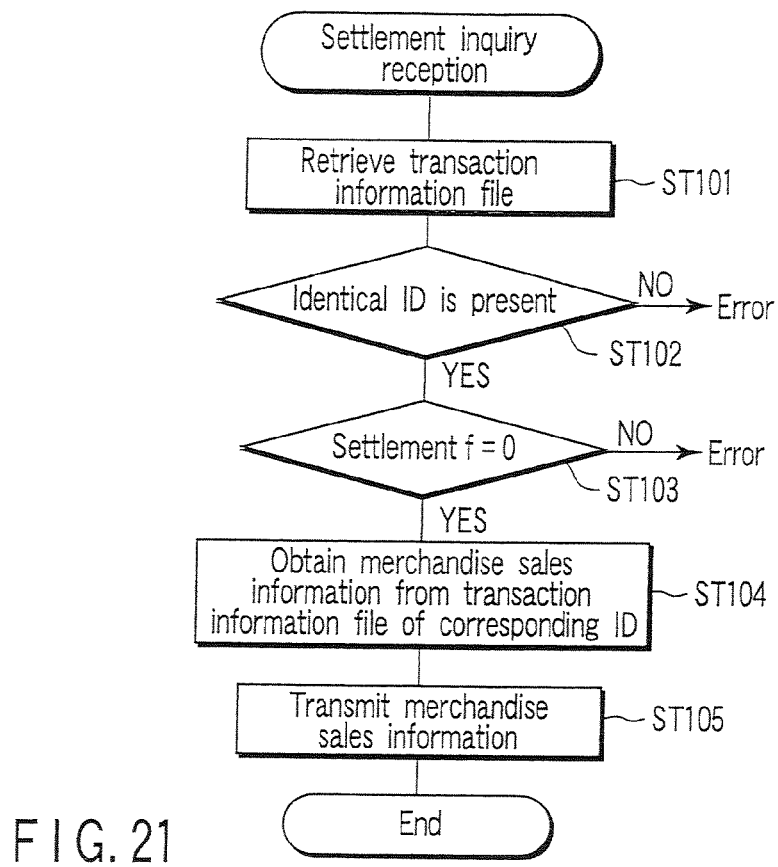
FIG. 21 shows a flowchart indicative of the main part of settlement inquiry reception processing to be executed by the shelf label management server.

FIG. 21 shows a flowchart indicative of the procedure of the settlement inquiry reception processing. When receiving the settlement inquiry message, in step ST101, the shelf label management server 113 retrieves the transaction information file F2 using an ID code included in the settlement inquiry message. Then, in step ST102, the shelf label management server 113 determines whether or not a transaction information record including the ID code is stored in the transaction information file F2.

In the case a transaction information record including the ID code is stored in the transaction information file F2, in step ST103, the shelf label management server 113 determines whether or not the settlement flag of the transaction information record is information "0" which indicates that the settlement is not finished. In the case the settlement flag is "0", a shopper for whom the ID code is issued has not completed the settlement of the commercial transaction. In this case, in step ST104, the shelf label management server 113 collectively reads out merchandise sales information (merchandise code, unit price, quantity, money amount) stored in the transaction information record including the ID code. Then, in step ST105, all the collectively read out merchandise sales information is transmitted to the POS terminal 15, which is the transmission source of the settlement inquiry message (commercial transaction information transfer means).

The merchandise sales information transmitted from the shelf label management server 113 is transmitted to the POS terminal 15, which is the transmission source of the settlement inquiry message through the POS server 115.

In step ST85, the CPU 1501 of the POS terminal 15 that transmits the settlement inquiry message waits for the merchandise sales information. Then, when receiving the merchandise sales information, in step ST86, the CPU 1501 stores the thus-received merchandise sales information in the RAM 1503. Furthermore, the CPU 1501 makes the operator display 1509 and customer display 150 display purchased merchandise account information such as merchandise name, unit price, quantity, money amount corresponding to the merchandise code of the merchandise sales information.

Then, in step ST87, the CPU 1501 determines whether or not there is performed a correction for the merchandise sales information. Then, by the key operation of the keyboard 1508 or the operation of scanning an optical scan code by a scanner, in the case there is performed a correction input such as addition, deletion, change, etc. with respect to the merchandise sales information, in step ST88, the CPU 1501 updates the merchandise sales information stored in the RAM 1503 to information which has been corrected. Furthermore, the purchased merchandise account information displayed on the operator display 1509 and customer display 150 is changed to the contents after correction.

Then, in step ST89, the CPU 1501 waits for a close key for declaring closing registration for one commercial transaction to be operated. Then, when the close key is operated, in step ST90, the CPU 1501 executes the settlement processing with respect to a well-known settlement method according to the kind of the close key, for example, the manner of payment such as cash, a credit card, a prepaid card, electronic money, and a debit card (settlement processing means). The settlement processing includes processing of registering sales data of merchandises in the RAM 1503 based on the merchandise sales information stored in the RAM 1503. Furthermore, in the case card data of a point card is read out by the card reader 1512, processing of calculating service points based on the merchandise sales information stored in the RAM 1503, and accumulating the service points for the respective customers is included.

When the settlement processing is completed, in step ST91, the CPU 1501 edits a settlement completion message, and sends the settlement completion message to the POS server 115 through the communication controller 1505 (completion user identification notification means). The settlement completion message includes the ID code stored in the RAM 1503. Then, the CPU 1501 ends the settlement key input processing of this time.

Every time the settlement completion message is received from the POS terminal 15, the POS server 115 transfers the settlement completion message to the shelf label management server 113. Every time the settlement completion message is received through the POS server 115, the shelf label management server 113 executes settlement completion reception processing.

Figure 22:
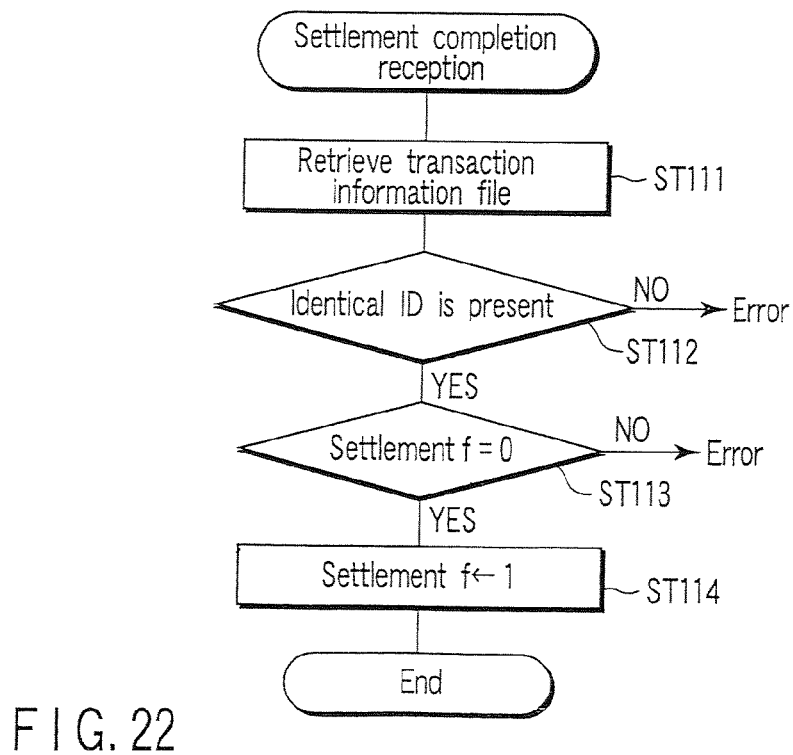
FIG. 22 shows a flowchart indicative of the main part of settlement completion reception processing to be executed by the shelf label management server.

FIG. 22 shows a flowchart indicative of the procedure of the settlement completion reception processing. When receiving the settlement completion message, in step ST111, the shelf label management server 113 retrieves the transaction information file F2 using an ID code included in the settlement completion message. Then, in step ST112, the shelf label management server 113 determines whether or not a transaction information record including the ID code is stored in the transaction information file F2.

In the case a transaction information record including the ID code is stored in the transaction information file F2, in step ST113, the shelf label management server 113 determines whether or not the settlement flag of the transaction information record is information "0", which indicates that the settlement is not finished. In the case the settlement flag is "0", in step ST114, the shelf label management server 113 updates the settlement flag to "1" (completion user identification management means). Then, the shelf label management server 113 ends the settlement completion reception processing of this time.

In a shop in which the merchandise registration processing system of this embodiment is established, fingerprint data, which is biometric information of a customer, is previously obtained for each customer who is a point member. Then, the fingerprint data is related to customer codes for identifying the customers and stored in the biometric information storage unit 166 of the respective ID issuance terminals 16.

On the other hand, a customer who comes to a shop firstly receives the bracelet 4 from the shop, and puts the bracelet 4 on his/her arm. Next, the customer approaches the ID issuance terminal 16, and makes the biometric information readout unit 167 read out a fingerprint of a finger of the customer which has been registered in the shop previously. Then, the ID issuance terminal 16 performs the identity authentication. Then, in the case the identity is recognized, an ID code is generated. This ID code is unique with respect to the customer, and is effective for only this instance of shopping. The ID code is written to the RFID tag 5 arranged on the bracelet 4 of the customer through the RFID reader/writer 168 in a noncontact manner. Furthermore, a transaction information record including the ID code is added to the transaction information file F2.

There may be employed a configuration in which the customer makes the ID issuance terminal 16 read out the customer's fingerprint before receiving the bracelet 4, and receives the bracelet 4 having the RFID tag 5 to which the ID code is written by the ID issuance terminal 16 from the shop.

Afterward, the customer shops in the shop. At this time, when there is a merchandise to be purchased, the customer reaches out, with the arm on which the bracelet 4 is placed, toward the merchandise display shelf 90 in order to seize the merchandise. Then, among the electronic shelf label devices 14 attached to the merchandise display shelf 90, the RFID tag 5 attached to the bracelet 4 comes into the communication area of the antenna 144 arranged on the electronic shelf label device 14 on which the name, price, etc. of the merchandise are displayed. Accordingly, an ID code stored in the memory unit of the RFID tag 5 is read out by the RFID reader/writer 143 arranged in the electronic shelf label device 14. Then, on the display unit 141 of the electronic shelf label device 14, the registration/cancellation confirmation screen is displayed.

Then, the customer takes the merchandise to be purchased from the merchandise display shelf 90 and puts the merchandise in a shopping basket or a shopping cart, and operates the "+" button to prescribe registering the merchandise. Then, in the electronic shelf label device 14, the registration merchandise information message is edited to be transmitted to the shelf label management server 113. The registration merchandise information message includes an ID code read out from the RFID tag 5 and a shelf label number unique with respect to the electronic shelf label device 14.

In the shelf label management server 113 which receives the registration merchandise information message, the transaction information file F2 is retrieved using the ID code in the message. Then, to the transaction information record including the ID code, merchandise sales information configured by a merchandise code and a unit price, a quantity (1), and a money amount (unit price) which are related to the shelf label number in the message to be stored and managed on the shelf label information file F1 is added. Furthermore, the total money amount of all the merchandise sales information stored and retained in the same transaction information record is calculated. Then, information indicative of the total money amount is transmitted to the electronic shelf label device 14, which is the transmission source of the registration merchandise information message. As a result, the total money amount is displayed on the display unit 141 of the electronic shelf label device 14.

When the shopper who operates the "+" button confirms the total money amount displayed on the display unit 141 of the electronic shelf label device 14, the shopper operates any one of the buttons arranged on the information input unit 142 of the electronic shelf label device 14. As a result, the electronic shelf label device 14 returns to the display state of the name and price of merchandise corresponding to the electronic shelf label device 14.

When the shopper cancels purchasing merchandise which has been registered once, the shopper returns the corresponding merchandise to the merchandise display shelf 90 using the hand on which the bracelet 4 is placed. At this time, the RFID tag 5 attached to the bracelet 4 comes into the communication area of the antenna 144 arranged on the electronic shelf label device 14 on which the name, price, etc. of the merchandise are displayed. Accordingly, an ID code stored in the memory unit of the RFID tag 5 is read out by the RFID reader/writer 143 arranged in the electronic shelf label device 14. Then, on the display unit 141 of the electronic shelf label device 14, the registration/cancellation confirmation screen is displayed.

Then, the shopper operates the "−" button to prescribe canceling the registration for the merchandise. Then, in the electronic shelf label device 14, the cancellation merchandise information message is edited to be transmitted to the shelf label management server 113. The cancellation merchandise information message includes an ID code read out from the RFID tag 5 and a shelf label number unique with respect to the electronic shelf label device 14.

In the shelf label management server 113 which receives the cancellation merchandise information message, the transaction information file F2 is retrieved using the ID code in the message. Then, from the transaction information record including the ID code, merchandise sales information configured by a merchandise code and a unit price, a quantity (1), and a money amount (unit price) which are related to the shelf label number in the message to be stored and managed on the shelf label information file F1 is deleted. Also in this case, the total money amount of all the merchandise sales information stored and retained in the same transaction information record is calculated. Then, information indicative of the total money amount is transmitted to the electronic shelf label device 14, which is the transmission source of the registration merchandise information message. As a result, the total money amount is displayed on the display unit 141 of the electronic shelf label device 14.

When the shopper who operates the "−" button confirms the total money amount displayed on the display unit 141 of the electronic shelf label device 14, the shopper operates any one of the buttons arranged on the information input unit 142 of the electronic shelf label device 14. As a result, the electronic shelf label device 14 returns to the display state of the name and price of merchandise corresponding to the electronic shelf label device 14.

In the case the shopper does not perform any button operation when the registration/cancellation confirmation screen is displayed, after a constant time period has elapsed, the electronic shelf label device 14 returns to the display state of the merchandise name and price. Furthermore, also in the case the shopper does not perform any button operation when the total money amount display screen is displayed, after a constant time period has elapsed, the electronic shelf label device 14 returns to the display state of the merchandise name and price.

In this way, every time the shopper who wears the bracelet 4 on his/her arm takes a merchandise to be purchased from the merchandise display shelf 90, the shopper operates the "+" button of the electronic shelf label device 14 on which the name and price of the merchandise are displayed to register the merchandise. Furthermore, in the case of canceling the purchase of the merchandise which has been registered once, after returning the merchandise to the merchandise display shelf 90, the shopper operates the "−" button of the electronic shelf label device 14 on which the name and price of the merchandise are displayed to cancel the registration. In this way, in the transaction information record including the ID code of the RFID tag 5 which is attached to the bracelet 4 carried about by the shopper, merchandise sales information of merchandises, which have been registered and are not canceled, are stored and retained collectively.

In this way, when the shopper has collected all merchandises to be purchased on that day, the shopper takes the merchandises to the settlement place, and makes an offer of the settlement to a cashier. The cashier receives the bracelet 4 from the shopper, and sets the bracelet 4 close to the POS terminal 15. Then, the cashier operates the settlement key K1. As a result, by the RFID reader/writer 1507 arranged in the POS terminal 15, an ID code of the RFID tag 5 attached to the bracelet 4 is read out in a noncontact manner. Then, the settlement inquiry message including the ID code is transmitted from the POS terminal 15 to the shelf label management server 113.

In this way, in the shelf label management server 113, the transaction information file F2 is retrieved. Then, the merchandise sales information stored and retained in the transaction information record including the ID code is read out collectively, and is transmitted to the POS terminal 15, which is the transmission source of the settlement inquiry message. In this way, on the operator display 1509 and customer display 1510 of the POS terminal 15, purchased merchandise account information such as merchandise name, unit price, quantity, money amount corresponding to the merchandise code of the merchandise sales information received from the shelf label management server 113 is displayed.

Next, the cashier collates the merchandises which the shopper purchases with the display contents. In the case they do not accord with each other, addition, cancellation, correction, etc. of the merchandise sales information are performed by operating the keyboard 1508 and scanner to make the merchandises and the display contents accord with each other. Then, the cashier requests the customer to make payment for the charge. Then, the cashier operates a close key according to the kind of payment of the customer. As a result, in the POS terminal 15, settlement processing according to the kind of payment is executed. Then, after the settlement processing has been completed, the settlement completion message including the ID code is transmitted from the POS terminal 15 to the shelf label management server 113. As a result, in the shelf label management server 113, the settlement flag of the transaction information record including the ID code is set to "1".

Afterward, the cashier puts the bracelet 4 received from the shopper in the bracelet recovery box 7. Then, by the RFID reader/writer 171 arranged in the ID recovery terminal 17, an ID code of the RFID tag 5 attached to the bracelet 4 is read out. As a result, in the shelf label management server 113, the recovery flag of the transaction information record including the ID code is set to "1". Furthermore, the ID code of the RFID tag 5 is cleared. Accordingly, the bracelet 4 can be reused for the next shopper.

In this way, when the shopper takes a merchandise to be purchased from the merchandise display shelf 90, since the shopper him/herself operates the electronic shelf label device 14 which is so arranged as to correspond to the merchandise, the sales information of the merchandises can be stored and managed for the respective shoppers in the server device 11. Furthermore, since the merchandise sales information stored and managed for the respective shoppers on the server device 11 is called up in the POS terminal 15 for the respective shoppers, execution of the settlement processing based on the merchandise sales information becomes possible.

Accordingly, in the POS terminal 15, since it is not necessary to register merchandises which the customer purchases one by one, the time required for the registration work can be significantly reduced. In this case, since it is not necessary to attach wireless tags for all the merchandises to be sold in a shop one by one, the system in this embodiment is not troublesome as compared with a merchandise registration processing system using wireless tags.

The only operation of a shopper necessary in registering a merchandise to be purchased and canceling the registration is performing the one-touch operation with respect to the buttons of the information input unit 142 arranged on the electronic shelf label device 14. Therefore, the shopper does not feel much burden when performing the operation. Accordingly, in a supermarket, etc., during a busy time where the waiting time for the settlement place becomes long, there can be brought about an advantage that the waiting time can be reduced for customers. Therefore, the advantage brought about when the present system is introduced becomes significantly large.

Every time the shopper registers a merchandise to be purchased or cancels the registration using the electronic shelf label device 14, the total money amount of merchandises to be purchased of the shopper up to the present time is displayed on the display unit 141 of the electronic shelf label device 14. Accordingly, the shopper can keep shopping without feeling worried about buying too much, which can improve the convenience.

In the above-described embodiment, while a cashier operates the POS terminal 15, which is the settlement device, registration of merchandises to the settlement device is automatically performed. Therefore, when an existing prepaid type electronic money settlement device, a debit card settlement device, a credit settlement device, etc. are used as a settlement device, there can be easily introduced a self-checkout system that can make a customer him/herself perform all the settlement works, which include giving and receiving the charge.

The present invention is not limited to the embodiments, and various modifications of components can be implemented without departing from the scope and spirit of the present invention.

For example, while the shelf label management server 113 manages the transaction information file F2 in the embodiment, other servers such as the POS server 115 or customer management server 114 may manage the transaction information file F2. Furthermore, a specialized dedicated server to manage the transaction information file F2 may be arranged in the server device 11.

Furthermore, in the embodiment, while a shopper wears bracelet 4 on his or her arm, there may be employed a configuration in which the paired bracelets 4 which have the RFID tags 5, to which the same ID code is written by the ID issuance terminal 16, are prepared, and the shopper wears the bracelets 4 on both arms to perform shopping. In this way, sales information of merchandise can be registered in the server device 11 whichever hand is used to take a merchandise to be purchased from the merchandise display shelf 90, which can prevent merchandise from not being registered. Furthermore, without using the bracelet 4, the RFID tag 5 may be directly attached to the arm, fingertip, or palm of a customer.

Furthermore, although in the embodiment the bracelet 4 is recovered, the bracelet 4 does not have to be recovered. In this case, as another configuration of the user identification device, there can be considered a gate device in which an ID code is read out from the bracelet 4 of the user passing through the gateway of a shop, and the ID code is transmitted to the customer management server 114 or the like of the server device 11, and operation for annunciation is performed when it is detected that there is no notification of settlement completion in the server device 11.

Furthermore, in the embodiment, the customer takes a merchandise to be purchased and performs a registration operation from the electronic shelf label device 14 corresponding to the merchandise, and, when performing the cancellation operation for the registration, the total money amount of the customer up to the present time is displayed on the display unit 141 of the electronic shelf label device 14 automatically. On the other hand, there may be employed a configuration in which the total money amount is not displayed when there is no designation from the customer by the operation of the information input unit 142 of the electronic shelf label device 14.

Furthermore, in the embodiment, the ID code is data which is effective while the user who is a customer is shopping. However, respective embodiments can be realized by, instead of a point card which is issued for, for example, a point member, distributing the bracelet 4 which has the RFID tag 5, to which a customer code is previously written, to use the customer code as the ID code. In this case, the ID issuance terminal 16 and ID recovery terminal 17 can be omitted from the merchandise registration processing system 1.

By arbitrarily combining the plural components disclosed in the embodiments, various inventions can be realized. For example, several components may be deleted from all the components shown in the embodiments. Furthermore, components of different embodiments may be combined.

The present invention can be utilized in a shop such as a supermarket in which the electronic shelf label management system is established.

What is claimed is:

1. A merchandise registration processing system which comprises a plurality of information terminal devices which are so arranged as to correspond to displayed merchandises and each of which has a display unit that displays information related to the merchandise, and a communication unit that receives information to be displayed on the display unit, a server device which has a terminal display controller for transmitting information to be displayed on the display units of the respective information terminal devices to the information terminal devices, and a settlement device that performs settlement processing of a commercial transaction, the information terminal devices, server device, and settlement device being connected by a communication network, the system characterized in that, the information terminal devices comprise a user recognition unit for obtaining, from a user who holds out an arm to a merchandise corresponding to the information terminal device, user identification information in a non-contact manner, an input receiving unit for, after the user identification information is obtained by the user recognition unit, receiving a registration input of a merchandise corresponding to the information terminal device, and a registration merchandise information transmission unit transmitting registration merchandise information including merchandise identification information for identifying the merchandise and the user identification information obtained by the user identification recognition unit from the communication unit to the server device through the communication network, the server device comprises an information reception unit for receiving information transmitted from the information terminal devices through the communication network, a transaction information storage unit that has a transaction information storage area for the respective user identification information, a registration merchandise information processing unit for adding merchandise identification information included in registration merchandise information received by the information reception unit to the transaction information storage area for the respective user identification information of the transaction information storage unit, and a commercial transaction information transfer unit for transferring transaction information stored for the respective user identification information in the transaction information storage unit to the settlement device, and the settlement device comprises an input unit for the user identification information, and settlement processing unit for performing the settlement processing by transaction information corresponding to the user identification information input by the input unit.

2. The merchandise registration processing system according to claim 1, wherein:

the input receiving unit of the information terminal devices can receive a registration cancellation input for merchandise corresponding to the information terminal device, the information terminal devices further includes a cancellation merchandise information transmission unit for, when there is a registration cancellation input for a merchandise, transmitting cancellation merchandise information including merchandise identification information for identifying the merchandise and user identification information obtained by the user identification recognition unit from the communication unit to the server device through the communication network, and the server device further includes a cancellation merchandise information processing unit for deleting the merchandise identification information included in the cancellation merchandise information received by the information reception unit from the transaction information storage area for the respective user identification information of the transaction information storage unit.

3. The merchandise registration processing system according to claim 2, wherein:

the information terminal devices further includes a first operation unit and a second operation unit, and the input receiving unit makes the operation input of the first and second operation units possible when the user recognition unit obtains the user identification information, and processes in such a manner that, when the operation of the first operation unit is detected, there is a registration input for a corresponding merchandise, and processes in such a manner that, when the operation of the second operation unit is detected, there is a registration cancellation input for a corresponding merchandise.

4. The merchandise registration processing system according to claim 1, wherein:

the system further comprises a user identification issuance device including a biometric information storage unit for storing biometric information of respective users which has been previously registered, a biometric information take-in unit for taking in biometric information of the users, an identity authentication unit for collating the biometric information taken in by the biometric information take-in unit with the biometric information of the respective users stored in the biometric information storage unit to perform the identity authentication, and a user identification issuance unit for, under a condition that the identity authentication of the user is established by the identity authentication unit, issuing user identification information with respect to the user, the user identification issuance device being connected to the communication network.

5. The merchandise registration processing system according to claim 4, wherein:

the user identification issuance unit writes, to a noncontact communication storage medium carried about by the user for whom the identity authentication is established, user identification information issued for the user by noncontact communication.

6. The merchandise registration processing system according to claim 5, wherein:

the system further comprises a user identification device which has a user identification obtention unit for reading out the user identification information written in the noncontact communication storage medium, a user identification transmission unit for transmitting the user identification information obtained by the user identification obtention unit to the server device, and an annunciation unit, the user identification device being connected to the communication network, the settlement device further includes a completion user notification unit for notifying the server device of the user identification information whose settlement processing by the settlement processing unit has been completed, and the server device further includes a completion user storage unit for storing information related to the user identification information which receives notification of the settlement completion from the settlement device, and an annunciation control unit for, when receiving the user identification information transmitted from the user identification device through the communication network, when information related to the user identification information is not stored by the completion determination unit, making the annunciation unit of the user identification device which is the transmission source of the user identification information operate for annunciation.

7. The merchandise registration processing system according to claim 1, wherein:

the server device includes a total calculation unit for calculating the total money amount for the respective user identification information based on transaction information stored for the respective user identification information in the transaction information storage unit, and a total money amount transfer unit for transferring data of the total money amount calculated by the total calculation unit to the information terminal device which is the transmission source of information received by the information reception unit, and the information terminal devices includes a total display control unit for displaying the total money amount of the commercial transaction on the display unit based on the total money amount data transferred from the server device.

8. The merchandise registration processing system according to claim 1, wherein:

the information terminal devices are arranged on merchandise display shelves, and are electronic shelf label devices which display prices of merchandises displayed on the shelves.

9. A merchandise registration processing system which comprises a plurality of information terminal devices which are so arranged as to correspond to displayed merchandises and each of which has a display unit that displays information related to the merchandise, and a communication unit that receives information to be displayed on the display unit, a server device which has a terminal display controller for transmitting information to be displayed on the display units of the respective information terminal devices to the information terminal devices, and a settlement device that performs settlement processing of a commercial transaction, the information terminal devices, server device, and settlement device being connected by a communication network, the system wherein, the information terminal devices comprise a user recognition unit for obtaining, from a user who holds out an arm to a merchandise corresponding to the information terminal device, user identification information in a noncontact manner, an input receiving unit for, after the user identification information is obtained by the user recognition unit, receiving a registration input of a merchandise corresponding to the information terminal device, and a registration merchandise information transmission unit for transmitting registration merchandise information including merchandise identification information for identifying the merchandise and the user identification information obtained by the user identification recognition unit from the communication unit to the server device through the communication network, and the server device comprises an information reception unit for receiving information transmitted from the information terminal devices through the communication network, a transaction information storage unit that has a transaction information storage area for the respective user identification information, a registration merchandise information processing unit for adding merchandise identification information included in registration merchandise information received by the information reception unit to the transaction information storage area for the respective user identification information of the transaction information storage unit, and a transaction information output unit for outputting transaction information for the respective user identification information stored in the transaction information storage unit.

10. The merchandise registration processing system according to claim 9, wherein:

the input receiving unit of the information terminal devices can receive a registration cancellation input for merchandise corresponding to the information terminal device, the information terminal devices further include a cancellation merchandise information transmission unit for, when there is a registration cancellation input for a merchandise, transmitting cancellation merchandise information including merchandise identification information for identifying the merchandise and user identification information obtained by the user identification recognition unit from the communication unit to the server device through the communication network, and the server device further includes a cancellation merchandise information processing unit for deleting the merchandise identification information included in the cancellation merchandise information received by the information reception unit from the transaction information storage area for the respective user identification information of the transaction information storage unit.

11. The merchandise registration processing system according to claim 9, wherein:

the server device includes a total calculation unit for calculating the total money amount for the respective user identification information based on transaction information stored for the respective user identification information in the transaction information storage unit, and a total money amount transfer unit for transferring data of the total money amount calculated by the total calculation unit to the information terminal device which is the transmission source of information received by the information reception unit, and the information terminal devices includes a total display control unit for displaying the total money amount of the commercial transaction on the display unit based on the total money amount data transferred from the server device.

12. An information terminal device comprising:

a display unit which is arranged to correspond to displayed merchandises and displays information related to the merchandise;

a communication unit which receives information to be displayed on the display unit from a server device connected through a communication network;

a user recognition unit which obtains, from a user who holds out an arm to a displayed merchandise, user identification information in a noncontact manner;

an input receiving unit which receives a registration input of the displayed merchandise after the user identification information is obtained by the user recognition unit; and a registration merchandise information transmission unit which transmits registration merchandise information including merchandise identification information for identifying the merchandise registered at the input receiving unit and the user identification information obtained by the user recognition unit, to the server device through the communication unit.

13. The information terminal device according to claim 12, wherein:

the input receiving unit can receive a registration cancellation input for the displayed merchandise, and the information terminal device further includes a cancellation merchandise information transmission unit for, when there is a registration cancellation input for a merchandise, transmitting cancellation merchandise information including merchandise identification information for identifying the merchandise and user identification information obtained by the user identification recognition unit to the server device through the communication network.

14. The information terminal device according to claim 13, wherein:

the information terminal device further includes a first operation unit and a second operation unit, and the input receiving unit makes the operation input of the first and second operation units possible when the user recognition unit obtains the user identification information, and processes in such a manner that, when the operation of the first operation unit is detected, there is a registration input for a corresponding merchandise, and processes in such a manner that, when the operation of the second operation unit is detected, there is a registration cancellation input for a corresponding merchandise.

15. The information terminal device according to claim 12, which is arranged on merchandise display shelves and functions as an electronic shelf label device which displays prices of merchandises displayed on the shelves.

* * * * *